(12) United States Patent
Hablani

(10) Patent No.: US 7,142,981 B2
(45) Date of Patent: Nov. 28, 2006

(54) LASER RANGE FINDER CLOSED-LOOP POINTING TECHNOLOGY OF RELATIVE NAVIGATION, ATTITUDE DETERMINATION, POINTING AND TRACKING FOR SPACECRAFT RENDEZVOUS

(75) Inventor: Hari B. Hablani, Westminster, CA (US)

(73) Assignee: The Boeing Company, Chicago, IL (US)

( * ) Notice: Subject to any disclaimer, the term of this patent is extended or adjusted under 35 U.S.C. 154(b) by 246 days.

(21) Appl. No.: 10/869,547

(22) Filed: Jun. 16, 2004

(65) Prior Publication Data

US 2005/0060092 A1   Mar. 17, 2005

Related U.S. Application Data

(60) Provisional application No. 60/492,596, filed on Aug. 5, 2003.

(51) Int. Cl.
*G01C 21/28* (2006.01)
*B64G 1/10* (2006.01)

(52) U.S. Cl. ............ 701/213; 701/3; 701/4; 701/13; 701/222; 701/225; 244/158.1; 244/164

(58) Field of Classification Search ............ 701/3, 701/4, 13, 200, 213–215, 220–226; 342/355, 342/357.01, 357.06, 357.12, 357.15; 244/158.1, 244/164, 171
See application file for complete search history.

(56) References Cited

U.S. PATENT DOCUMENTS

| 5,452,869 | A | 9/1995 | Basuthakur et al. |
| 6,089,507 | A | 7/2000 | Parvez et al. |
| 6,341,249 | B1 | 1/2002 | Xing et al. |
| 6,411,871 | B1 | 6/2002 | Lin |
| 6,454,217 | B1 | 9/2002 | Rodden et al. |
| 6,463,366 | B1 | 10/2002 | Kinashi et al. |
| 6,470,243 | B1 * | 10/2002 | Eyerly et al. .......... 701/13 |
| 6,484,973 | B1 | 11/2002 | Scott |
| 2002/0099677 | A1 | 7/2002 | Calise et al. |
| 2003/0057354 | A1 | 3/2003 | Wu et al. |
| 2003/0093194 | A1 | 5/2003 | Li et al. |
| 2003/0132878 | A1 | 7/2003 | Devereux et al. |

OTHER PUBLICATIONS

*Guidance and Relative Navigation for Autonomous Rendezvous in a Circular Orbit*, H. B. Hablani et al., Journal of Guidance, Control, and Dynamics, vol. 25, No. 3, May-Jun. 2002, pp. 553-562.

(Continued)

*Primary Examiner*—Y. Beaulieu
(74) *Attorney, Agent, or Firm*—Alston & Bird LLP

(57) ABSTRACT

A closed-loop LRF pointing technology to measure the range of a target satellite from a chaser satellite for rendezvous is provided that includes: LOS angle measurements of the target, a relative navigation Kalman filter, attitude determination of the visible sensor with gyros, star trackers and a Kalman filter, pointing and rate commands for tracking the target, and an attitude controller. An analytical, steady-state, three-axis, six-state Kalman filter is provided for attitude determination. The system provides improved functionality and precision for relative navigation, attitude determination, pointing, and tracking for rendezvous. Kalman filters are designed for the closed-loop system to allow for pointing the laser rangefinder to a target even if a visible sensor, a laser rangefinder, gyros and a star tracker are misaligned and the LOS angle measurements from the visible sensor are interrupted.

49 Claims, 29 Drawing Sheets

OTHER PUBLICATIONS

*Analytic Steady-State Accuracy of a Spacecraft Attitude Estimator*, F. L. Markley et al., Journal of Guidance, Control, and Dynamics, vol. 23, No. 6, Nov.-Dec. 2000, pp. 1065-1067.

*Precision Attitude Determination for GOES N Satellite*, Y. A. Wu et al., AAS 03-002, 21 pages, no date.

*Natural Motions of Rigid Spacecraft*, A. E. Bryson Jr., Ch. 1, Control of Spacecraft And Aircraft, (Princeton University Press, 1994), no month.

*Quaternion Parameterization and a Simple Algorithm for Global Attitude Estimation*, R. G. Reynolds, J. Guidance, Control, and Dynamics, vol. 21, No. 4: Engineering Notes, 1998, pp. 669-672, no date.

*Fast Quaternion Attitude Estimation from Two Vector Measurements*, F. L. Markley, 25 AIAA J. Guidance, Control, and Dynamics, vol. 25, No. 2, 2002, pp. 411-414, no date.

*Equations of Motion*, N. A. Shneydor, Missile Guidance and pursuit Kinematics, Dynamics and Control, Appendix A, (Horwood Publishing 1998), pp. 217-224, no date.

*Observability of Linear Dynamical Equations*, C. T. Chen, Introduction to Linear System Theory, Sec. 5.4; Holt, Rinehart and Winston, Inc., New York, 1970, no month.

*Use of LS For a Nonlinear Problem: Bearings-Only Target Motion Analysis*, Y. Bar-Shalom et al., Estimation With Applications to Tracking and Navigation, Sec. 3.7, John Whley and Sons, New York, 2001, no month.

*Nth-Order Dynamics Target Observability From Angle Measurements*, E. Fogel et al., 24 IEEE Trans. On Aerospace and Electronic Systems, vol. 24, No. 3, May 1988, pp. 305-308.

*The Popov-Belevitch-Hautus Tests for Controllability and Observability*, T. Kaliath, Linear Systems, Ch. 2, Prentice-Hall 1996, no month.

*Initial Value and Two Point Boundary Value Solutions to the Clohessy-Wiltshire Equations*, L. D. Mullins, J. Astronautical Sciences, vol. 40, No. 4, Oct.-Dec., 1992, pp. 487-501.

*High Fidelity Mathematical Modeling of Reaction Wheel Performance*, B. Bialke, AAS 98-063, pp. 483-496, no date.

\* cited by examiner $P_{\alpha\alpha}$ = variance of the position estimation error along
$\alpha$-axis ( $\alpha$ = x, y, z)

star_tracker_interval = 15 sec;
gyro drift rate estimate = 10% of true drift rate

NO MISALIGNMENT
ST UPDATE = 1 SEC, 15 SEC, 300 SEC

LASER RANGE FINDER CLOSED-LOOP POINTING TECHNOLOGY OF RELATIVE NAVIGATION, ATTITUDE DETERMINATION, POINTING AND TRACKING FOR SPACECRAFT RENDEZVOUS

CROSS REFERENCE TO RELATED APPLICATION

This application claims priority to and the benefit of the filing date of provisional application entitled "Laser Range Finder Closed-Loop Pointing Technology of Relative Navigation, Attitude Determination, Pointing and Tracking for Spacecraft Rendezvous," assigned Ser. No. 60/492,596 and filed Aug. 5, 2003, which is hereby incorporated by reference.

FIELD OF THE INVENTION

The present invention relates generally to electronic control systems for rendezvous of spacecraft in orbit, and, more particularly, to laser range finder closed-loop pointing control systems of relative navigation, attitude determination, pointing, tracking, and guidance subsystems for autonomous spacecraft rendezvous.

BACKGROUND OF THE INVENTION

Navigating and controlling a spacecraft for rendezvous with another spacecraft in a circular orbit is a difficult and complicated process. Further compounding this process are the precise nature and errors of the measurements for navigating and controlling a spacecraft for rendezvous with a spacecraft in a circular orbit.

Spacecraft navigation systems typically include multiple components. These systems may include various types of sensors to provide measurements for the component systems, such as visible and infrared sensors, laser range finders, mechanical or ring laser gyros, accelerometers, Sun sensors, star trackers, and GPS (global positioning system) receivers. These instruments often are misaligned and their measurements are corrupted with noise. Kalman filters may be used to provide estimates of relative position, velocity, attitude and rates.

When two spacecraft in near-Earth circular orbits are within a distance of approximately 10 km, guidance policies for a chaser satellite may be based on linear Clohessy-Wiltshire equations. The calculation of guidance delta-velocities utilized by the Clohessy-Wiltshire equations for rendezvous and proximity operations requires position and velocity estimates of the chaser satellite relative to the target satellite.

For this process to be automated, a laser range finder (LRF) instrument, mounted on a chaser satellite, may be pointed to a target satellite so that the range between the two spacecraft may be measured. However, because of the narrow width of the laser beam and small target size, the laser range finger (LRF) must be pointed accurately at the target to approximately 90 μrad/axis, or 1σ, in both azimuth and elevation from a distance of approximately 10 km. This stringent pointing accuracy must be accomplished with a collimated visible sensor while multiple factors further complicate the process, such as: the relative position and velocity of the chaser satellite are not accurately known, the gyroscope and star tracker measurements of the chaser satellite attitude are noisy, the line-of-sight (LOS) angle measurements from the focal plane of the visible sensor are noisy, sensors may be mutually misaligned, and a reaction wheel attitude controller may be turning the chaser satellite about its roll axis, parallel to the visible sensor boresight and the laser range finder (LRF) beam, so that two solar arrays of the spacecraft, each with only one articulation degree-of-freedom about the pitch axis, maintain Sun-pointing. Furthermore, due to the occasional poor lighting of the target satellite, the visible sensor measurements can be interrupted. If this occurs, the laser range finger (LRF) pointing will be lost. But, when the visible sensor measurements resume, the required pointing accuracy must be quickly regained.

An improved technology is needed to address the above problems for relative navigation, attitude determination, pointing and tracking for spacecraft rendezvous in a circular orbit.

BRIEF SUMMARY OF THE INVENTION

A closed-loop control system for autonomous spacecraft navigation is disclosed. The system and its component technologies provide improved functionality and precision for attitude determination, relative navigation, pointing, and tracking for spacecraft rendezvous in a circular orbit, or, more precisely, near circular orbit. Kalman filters of embodiments of the present invention are provided that may be applied to an architecture of one embodiment of a closed-loop system of the present invention to allow for autonomous navigation of a spacecraft even if different sensors are misaligned and measurement information is suspended, such as when a visible sensor operation is interrupted due to poor lighting of the target satellite. Kalman filters of the present invention account for, or are tolerant of, various misalignments between sensors, such as gyros, star trackers, visible sensors, and laser range finders. And because of the closed-loop integrated architecture design of one embodiment of the present invention and the versatility of the Kalman filters of the present invention, the navigation process continues even in a temporary absence of complete measurement information.

One embodiment of the present invention provides a combination of component technologies for autonomous attitude determination, relative navigation, pointing, and tracking for spacecraft rendezvous in a circular orbit. An embodiment of this combination is provided that is used to point a laser ranger finder at a target satellite with effective pointing accuracy.

One embodiment of the present invention provides an analytical technique and algorithm for correcting gyro errors using star tracker measurements for precise attitude determination. One embodiment of the present invention uses a space integrated global positioning system and inertial positioning system (Space Integrated GPS/INS or SIGI) of a chaser satellite supplemented by a steady-state three-axis correction algorithm for gyro-measured attitude determination errors using star tracker measurements.

One embodiment of the present invention provides Kalman filter relative navigation component technology. One embodiment of the present invention determines the relative position and velocity of a target satellite using a Kalman filter that accepts line-of-sight (LOS) azimuth and elevation angle measurements from visible and infrared sensor focal planes, laser range finder range measurements, if available, and attitude estimates from a six-state attitude Kalman filter.

From another embodiment of the present invention, it is shown that the in-track distance of a target satellite is observable from the elevation angle measurement of the focal plane, provided the relative altitude between the chaser satellite and the target satellite is not zero, or equivalently, the elevation angle is nonzero. Thus, a laser range finder is not a compelling requirement for long-range (~10 km) measurements of a target satellite in one embodiment of the present invention. In yet another embodiment of the present invention, it is shown that if a laser range finder must be used nonetheless for long-range measurements of a target satellite, a collimated visible sensor can be pointed with effective accuracy using angle measurements of the visible sensor, a six-state extended Kalman filter for relative navigation, pointing commands, an attitude controller, SIGI gyros and a star tracker for attitude measurements, and a six-state Kalman filter for gyro measurement updates using star tracker measurements.

One embodiment of the present invention provides a technique to achieve virtual observability of a target in presence of visual measurement interruptions. In one embodiment of the present invention the observability of a visible sensor for estimating the range of a target from azimuth and elevation angles at long range is maintained by propagating the relative position and velocity estimation of the spacecraft just prior to the interruption, provided estimates of relative incremental velocity continue to be available from the accelerometer and simulated environment.

One embodiment of the present invention provides a technique to use the roll angle freedom of pointing commands to orient the solar arrays of a chaser satellite towards the Sun. In one embodiment of the present invention, these pointing commands refer to quaternion attitude pointing commands and angular rate commands for a chaser satellite attitude controller that may be used for any of acquiring and tracking a target satellite, pointing a laser range finder at a target satellite, and orienting a solar array towards the Sun.

BRIEF DESCRIPTION OF THE DRAWINGS

Figure 1:
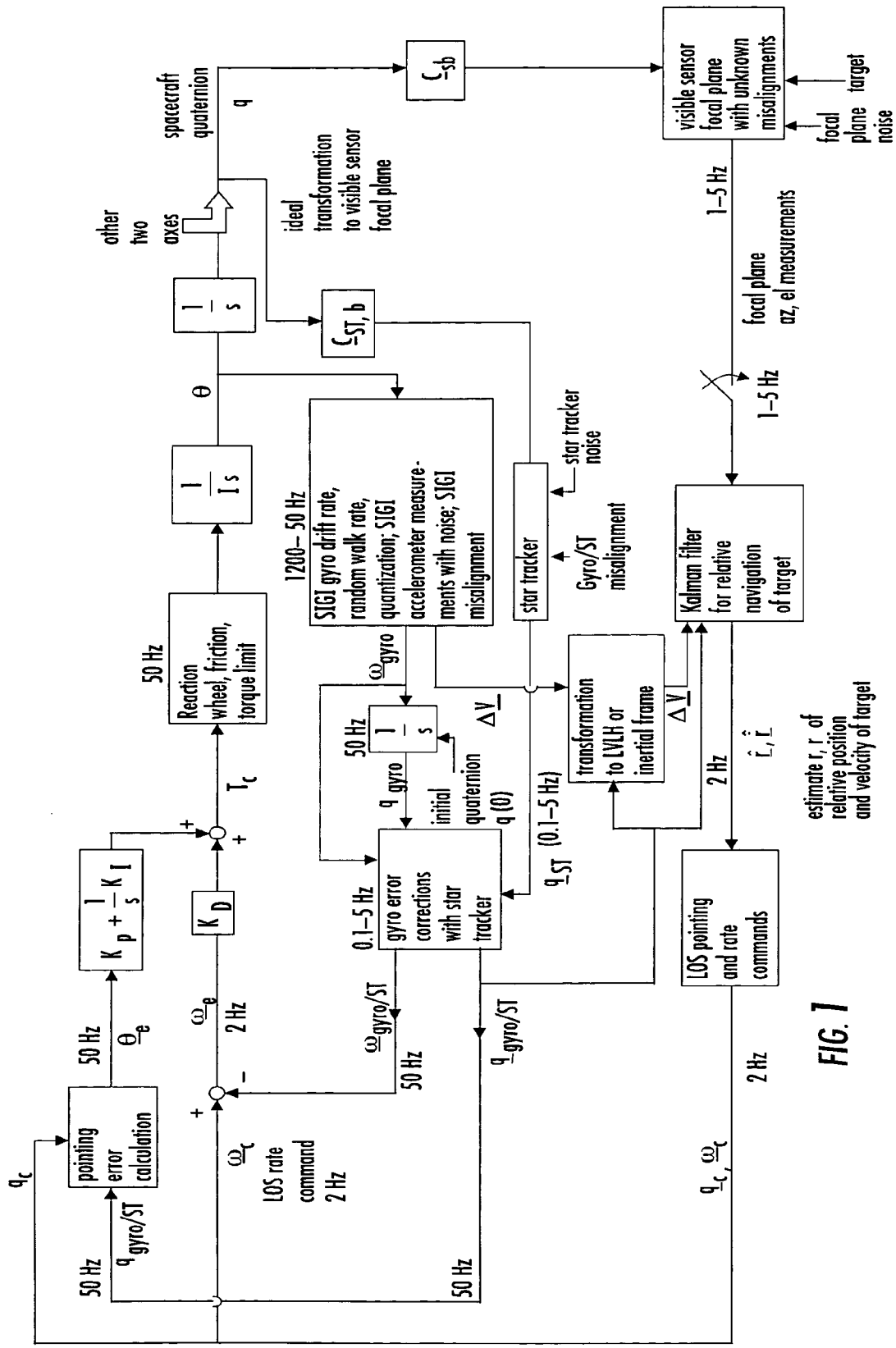
Figure 2A:
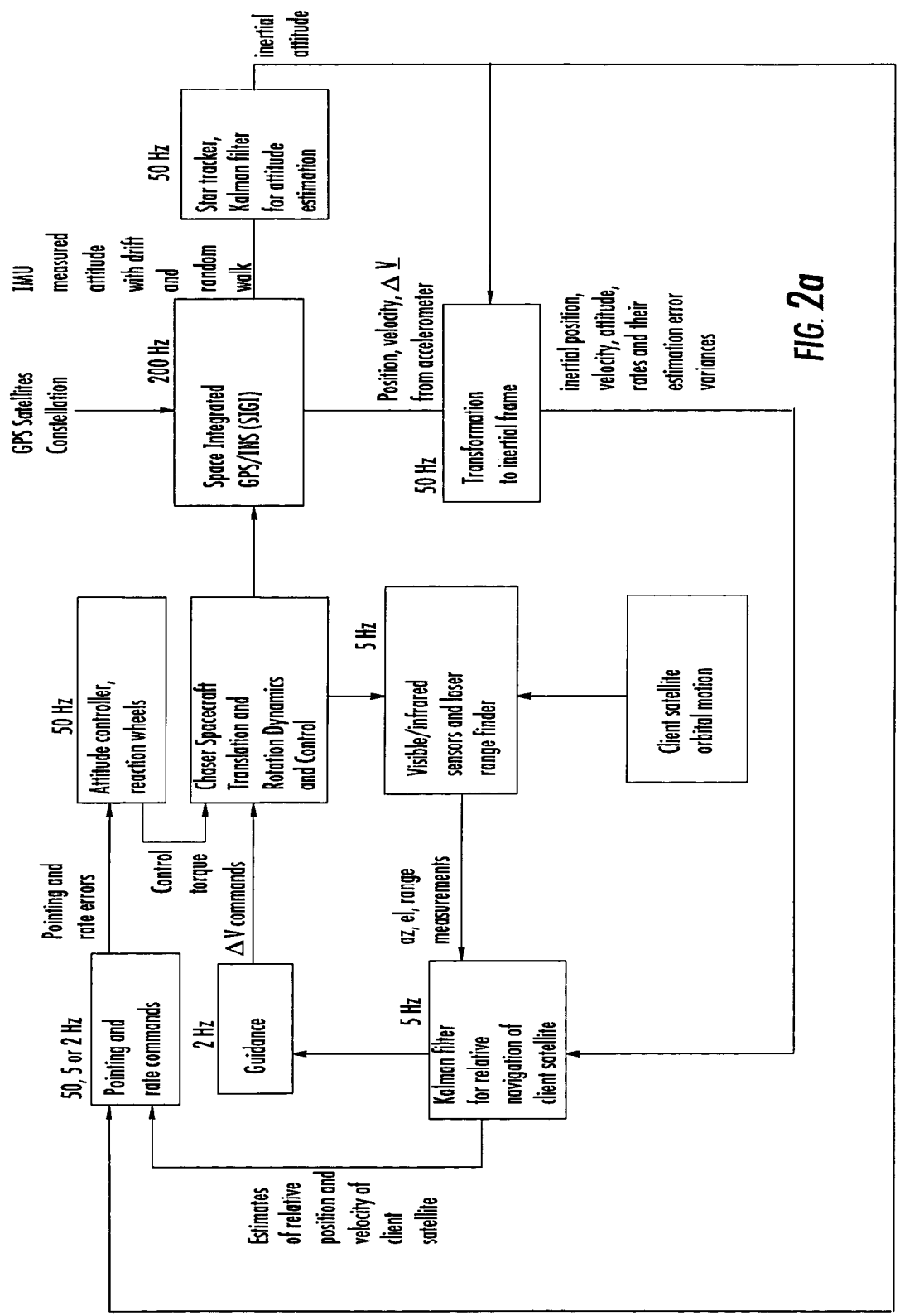
Figure 2B:
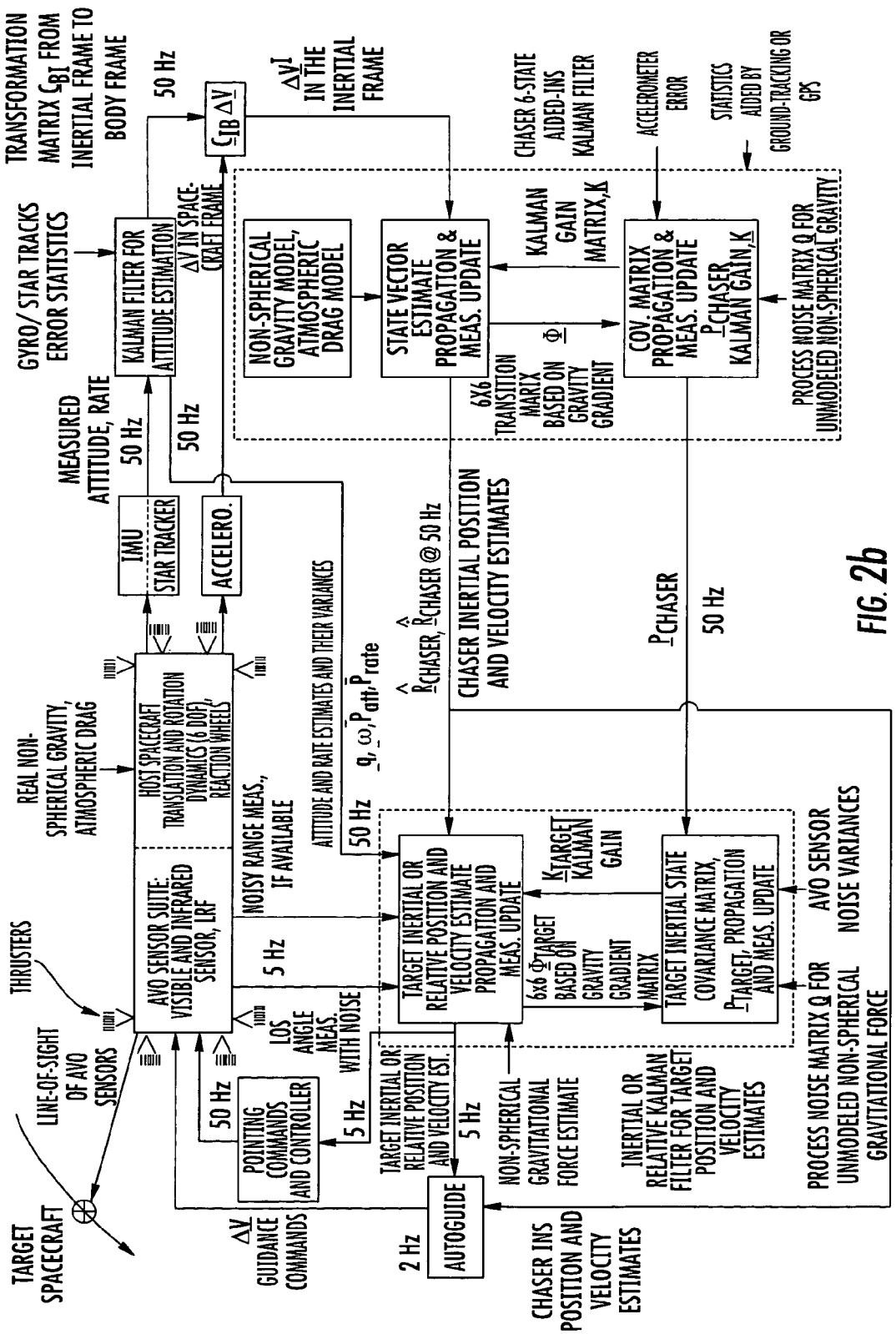
Figure 3:
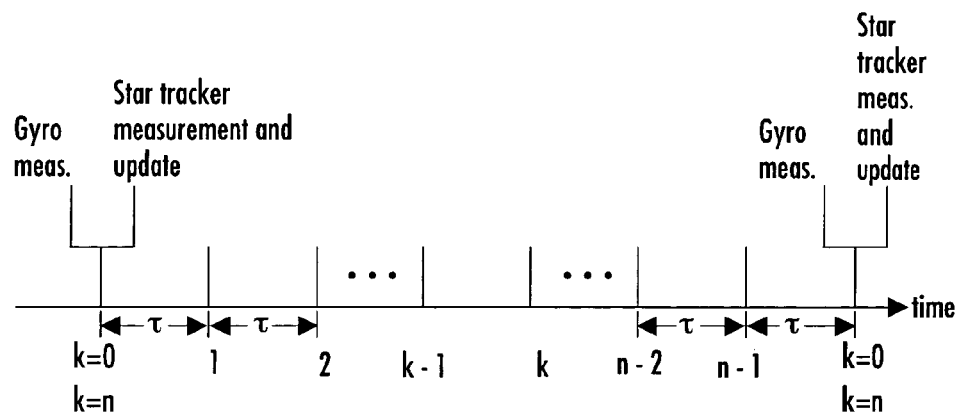
Figure 4:
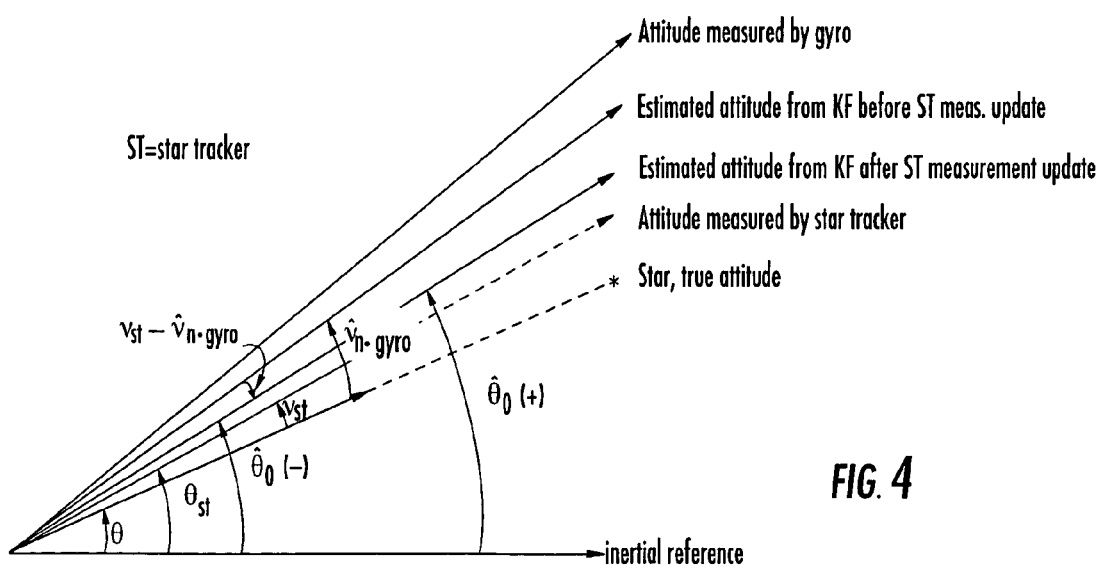
Figure 5A:
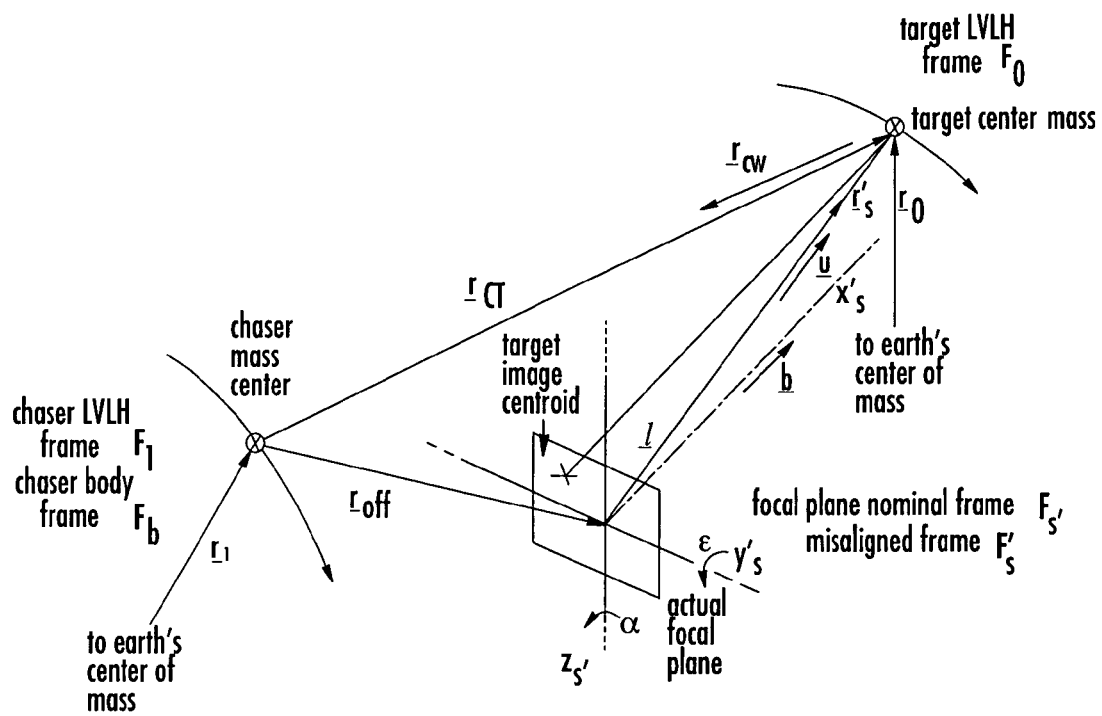
Figure 5B:
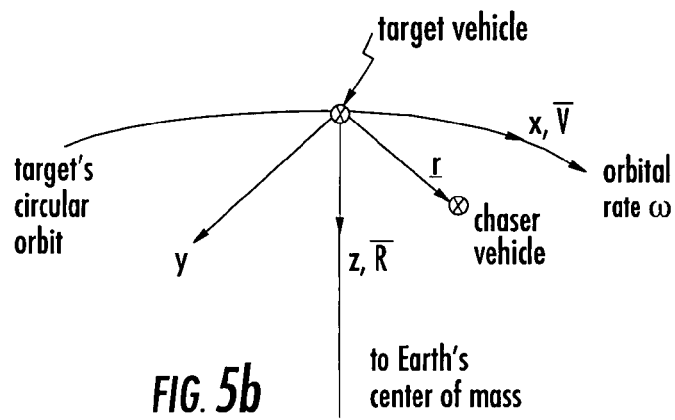
Figure 6:
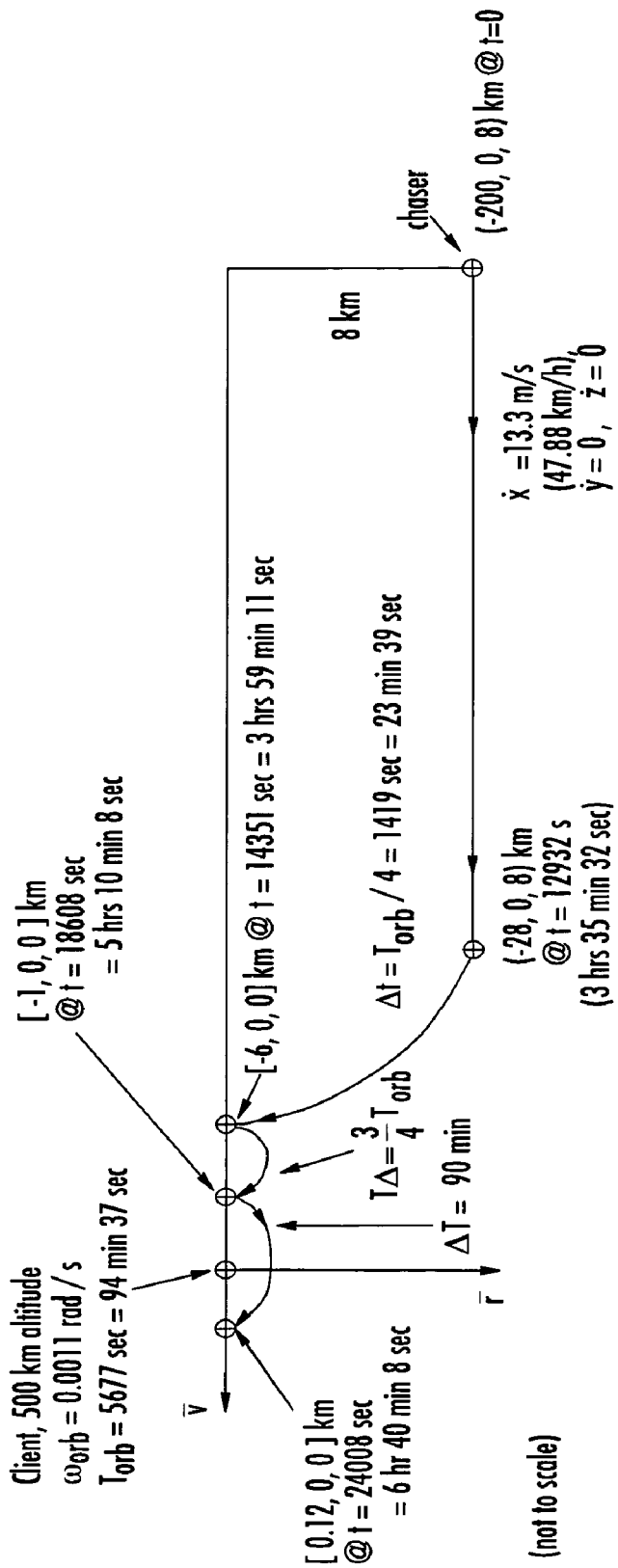
Figure 7A:
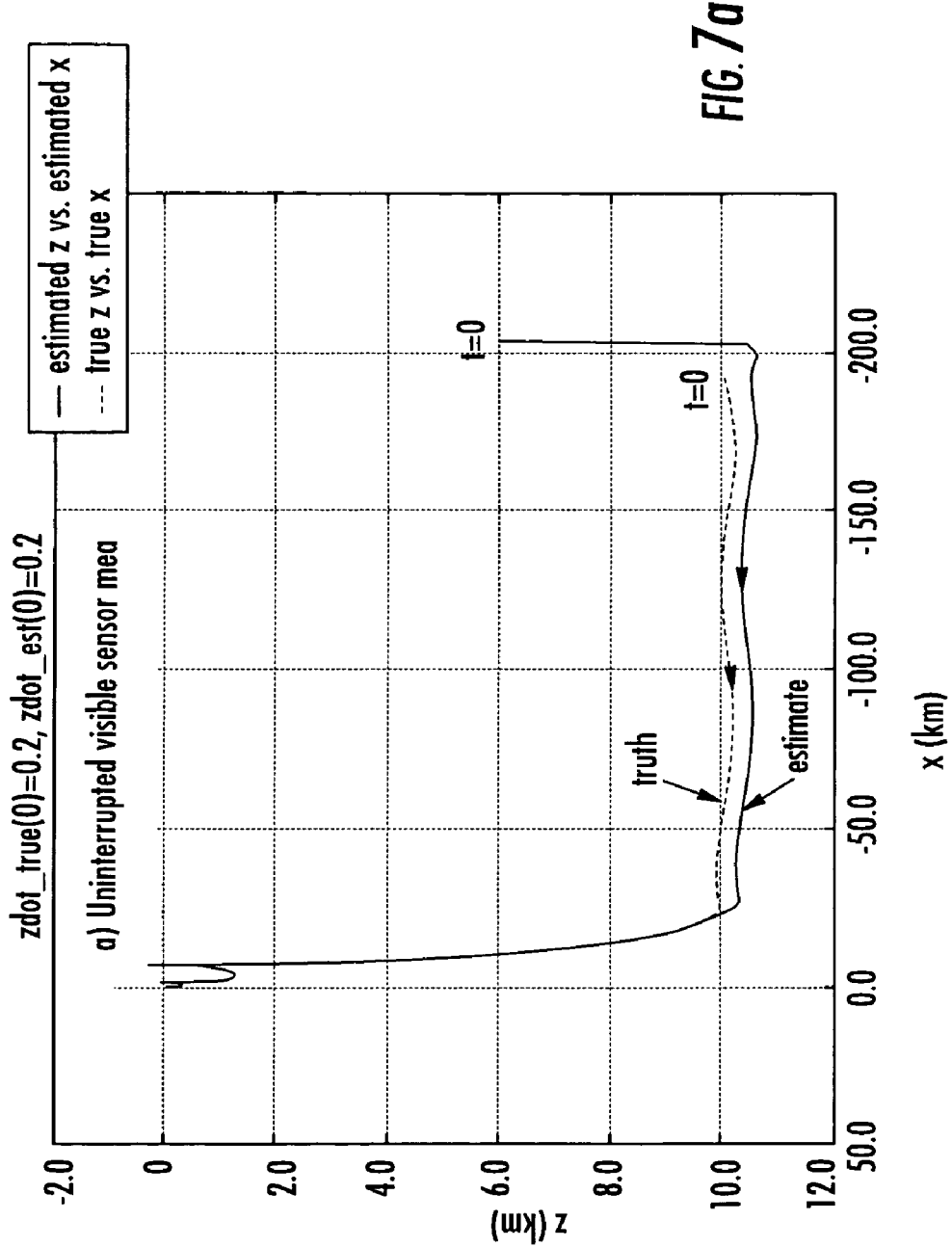
Figure 7B:
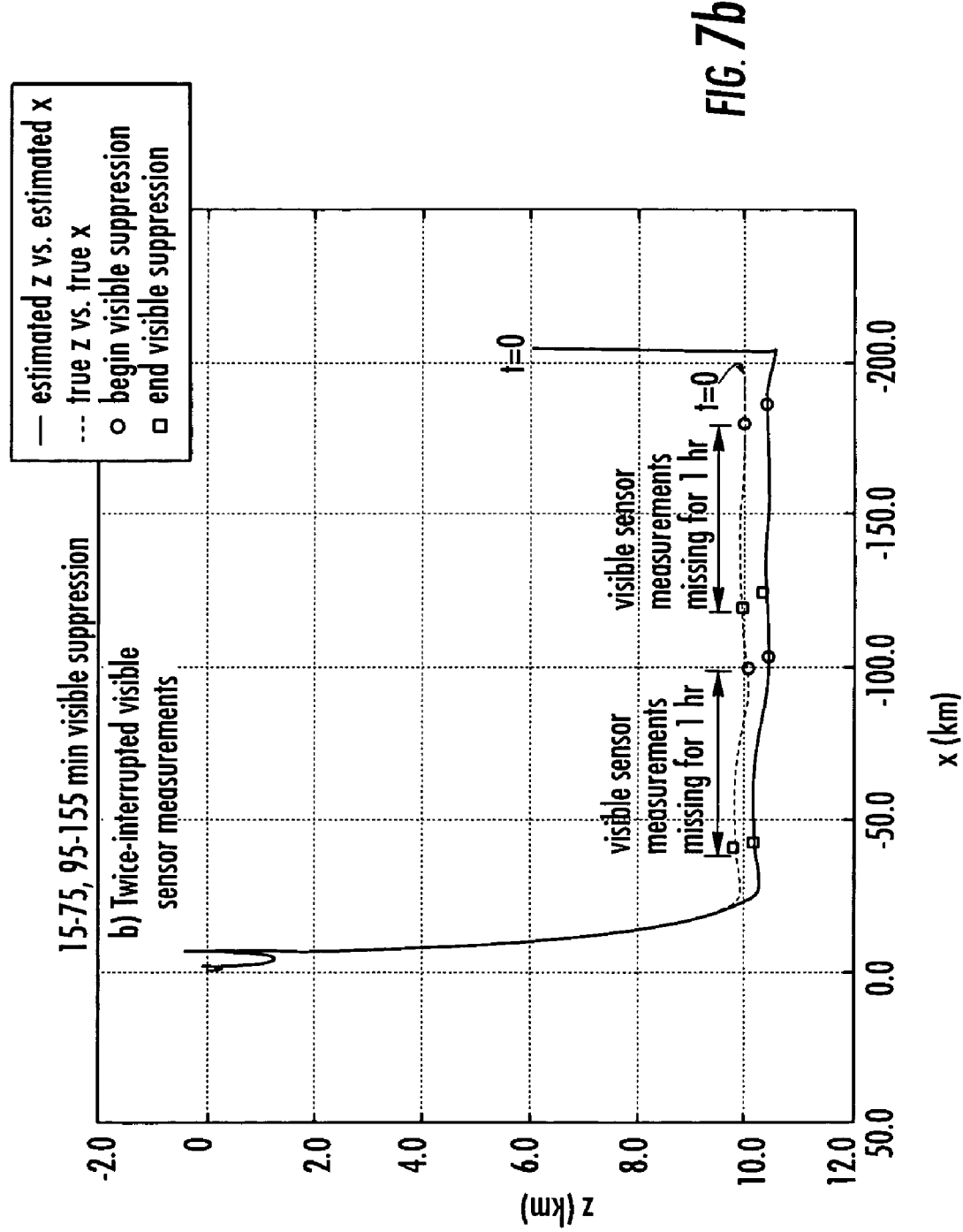
Figure 8A:
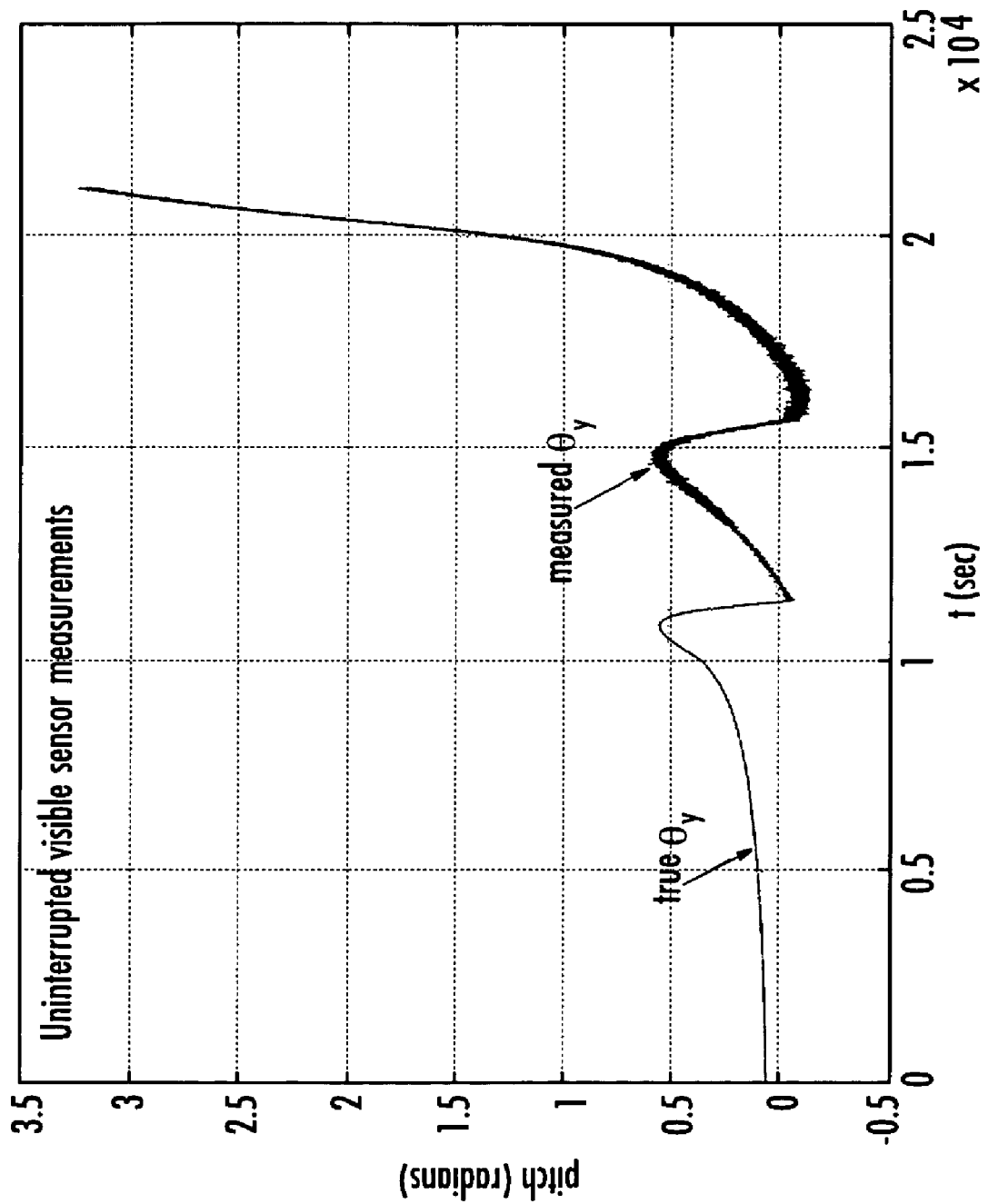
Figure 8B:
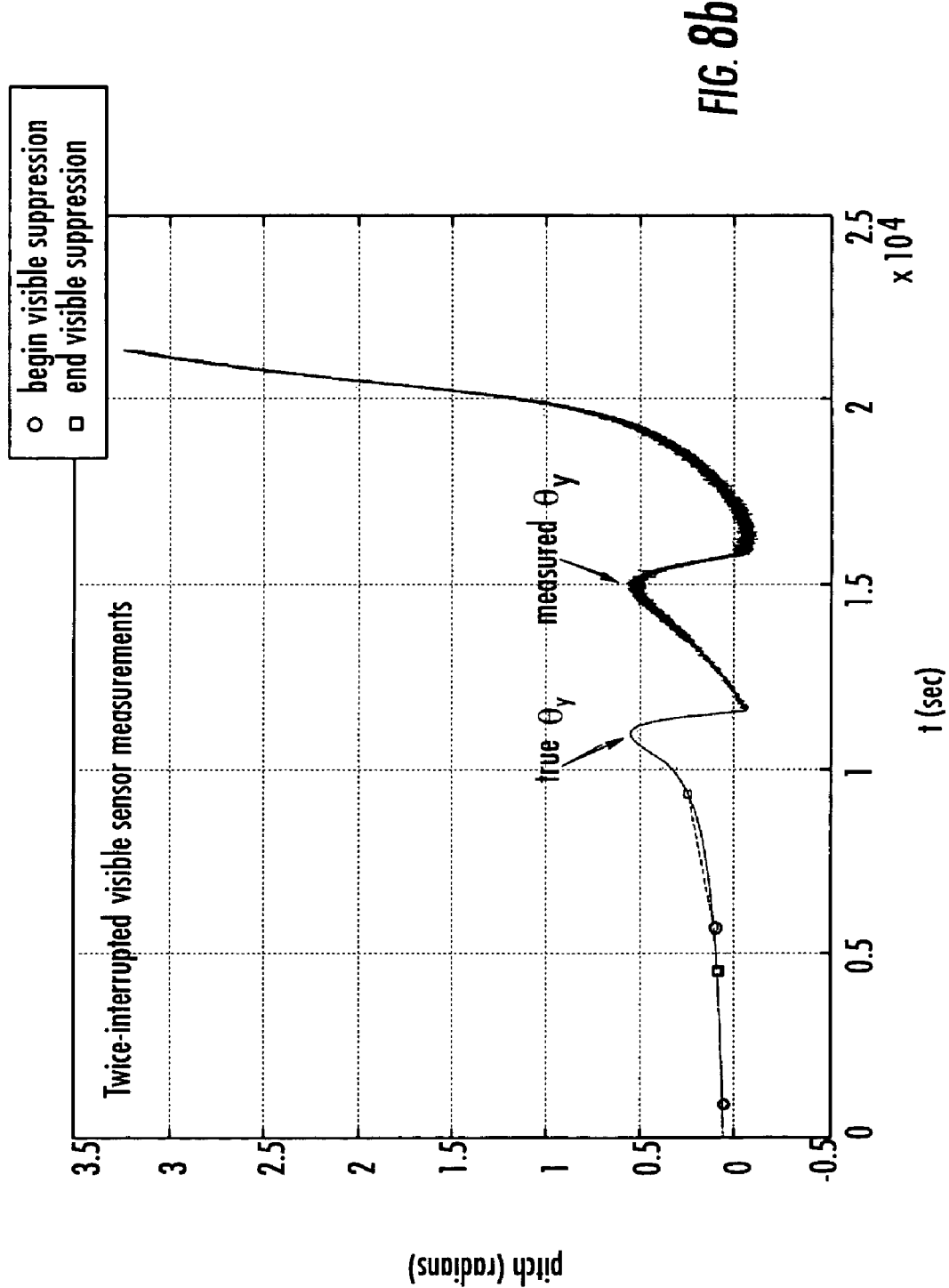
Figure 9A:
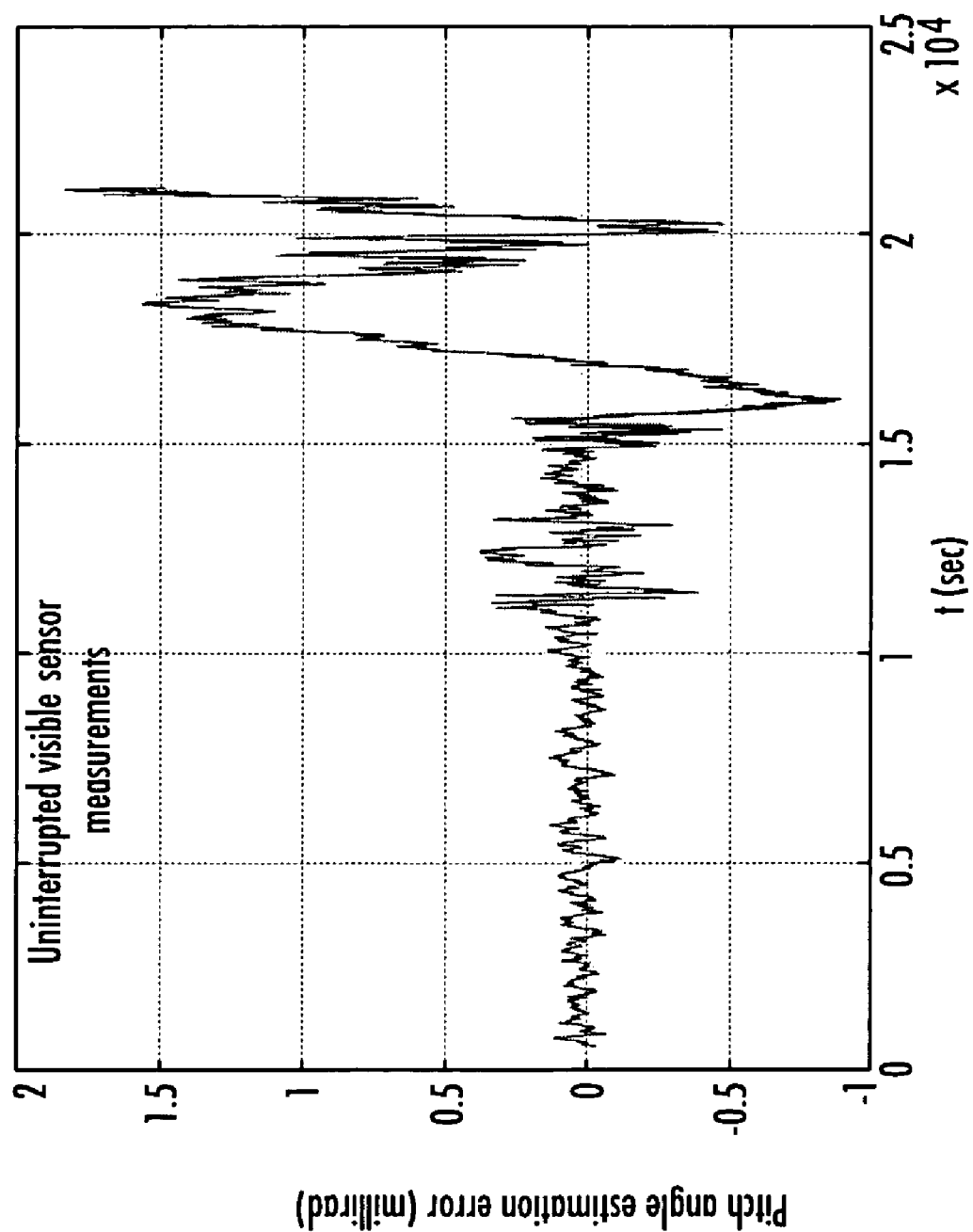
Figure 9B:
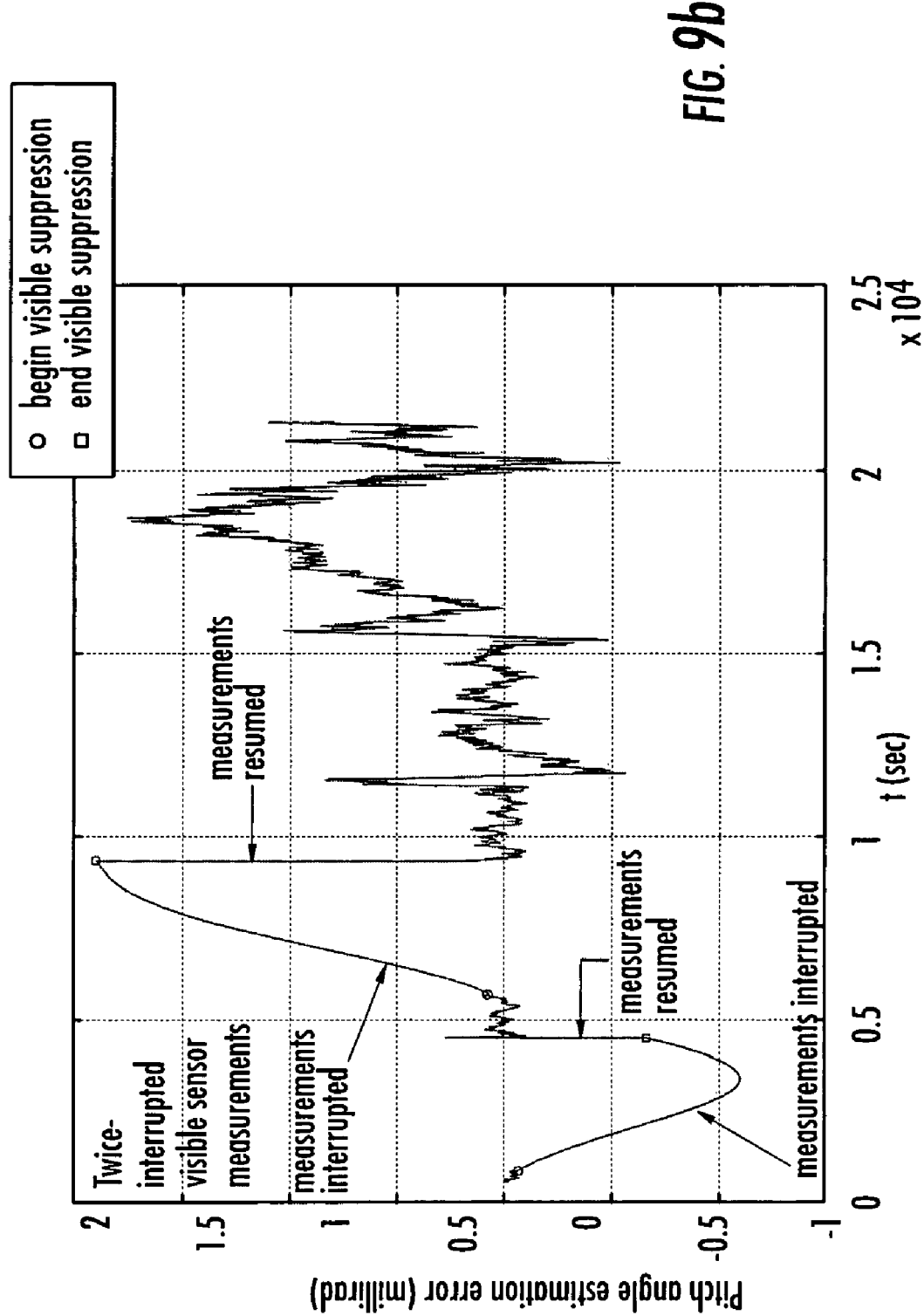
Figure 10A:
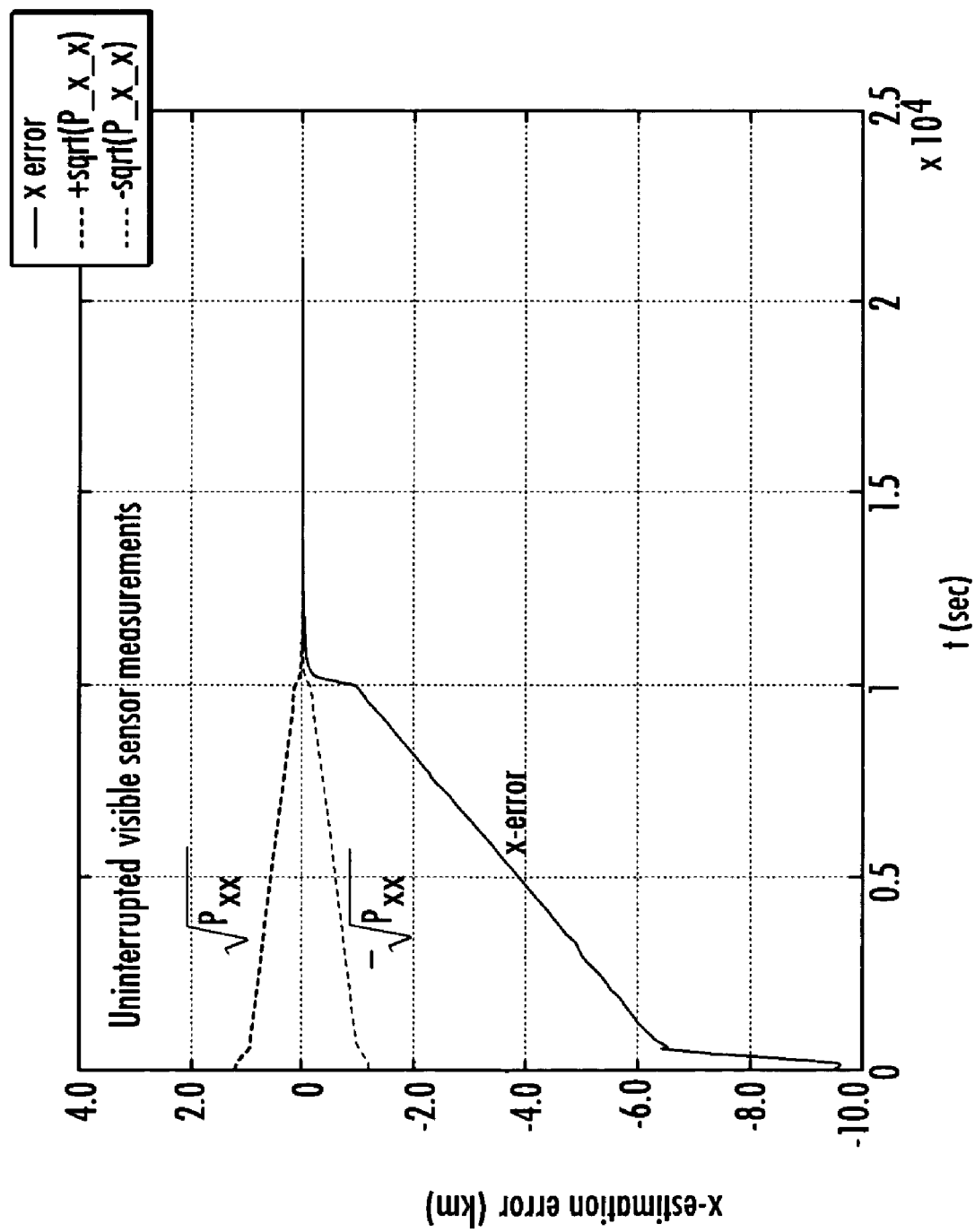
Figure 10B:
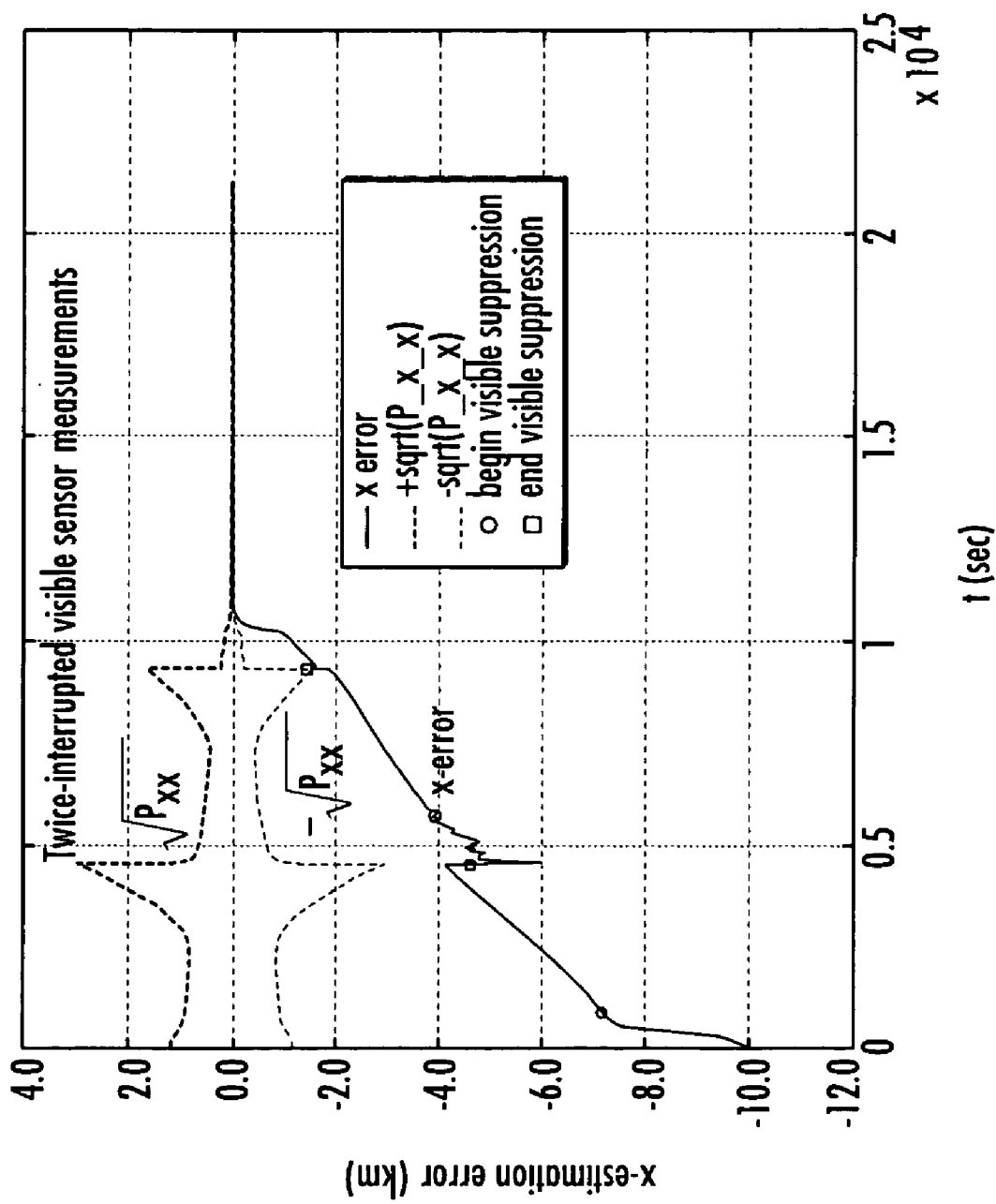
Figure 11A:
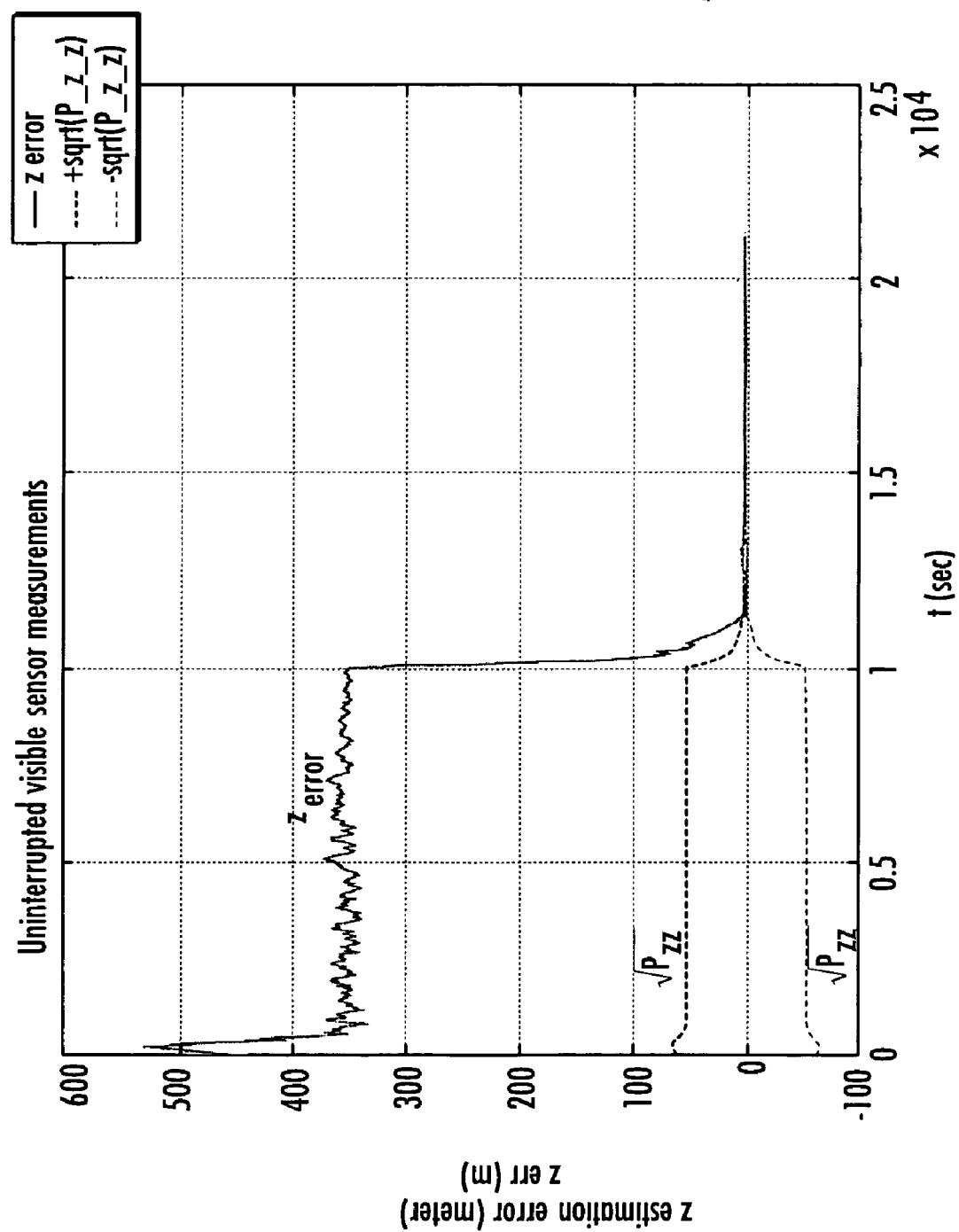
Figure 11B:
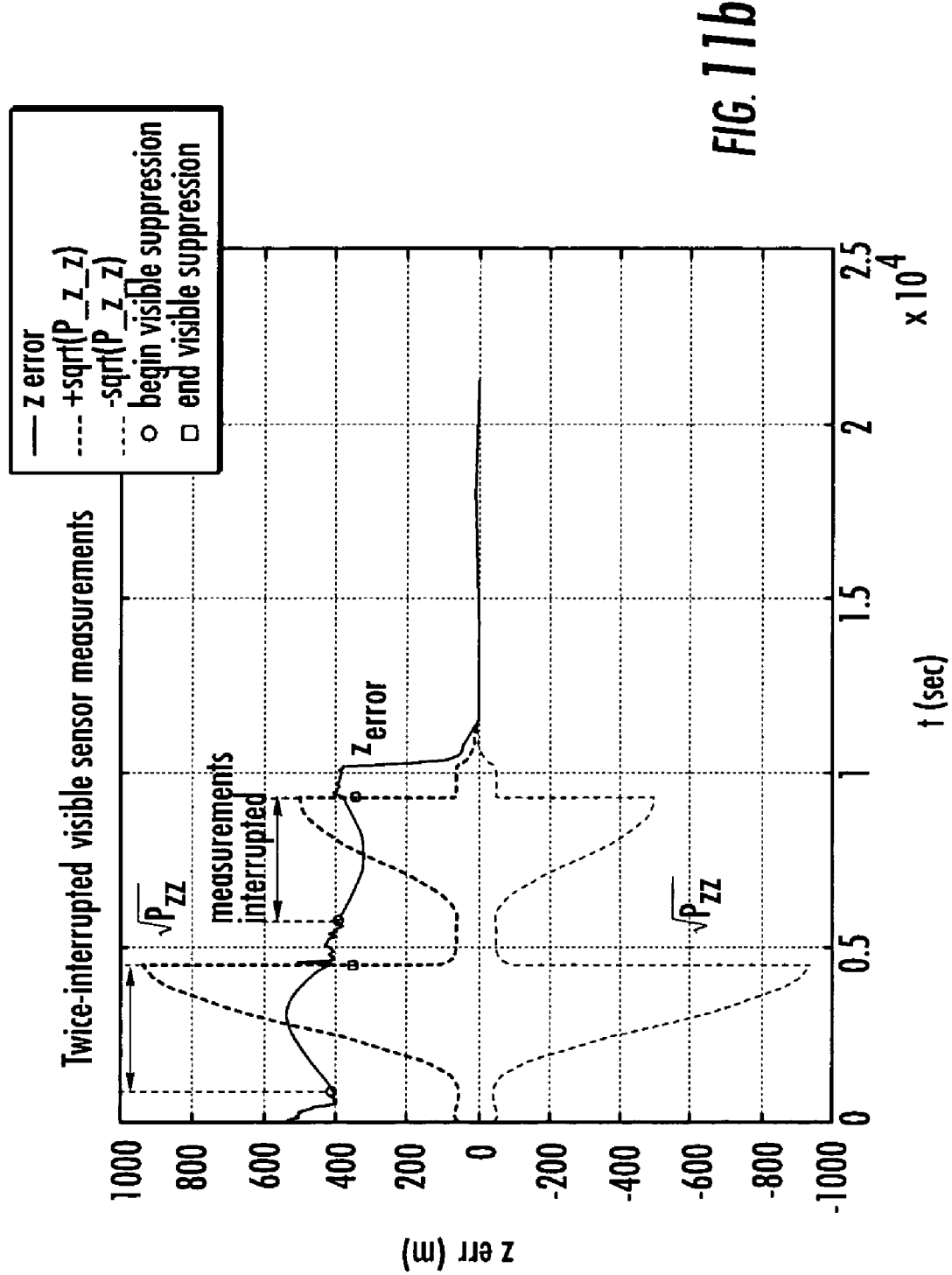
Figure 12A:
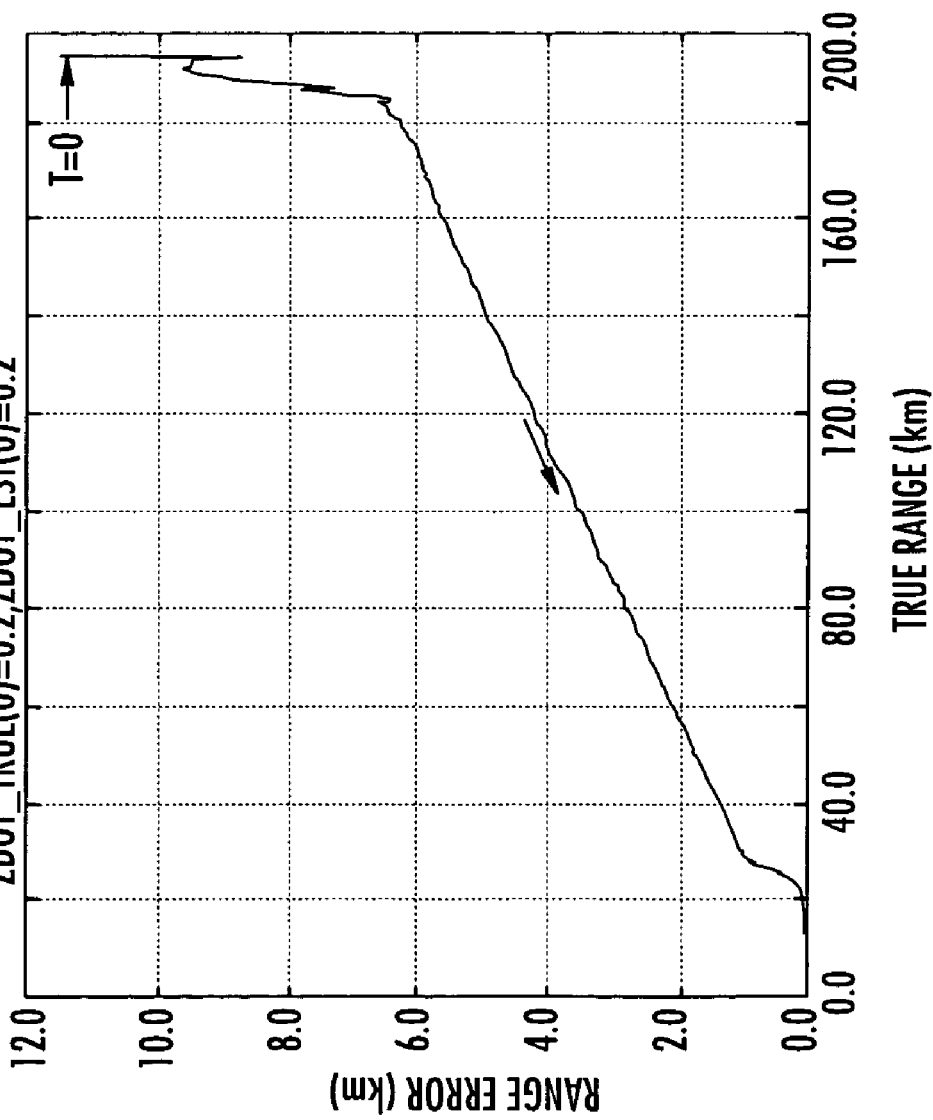
Figure 12B:
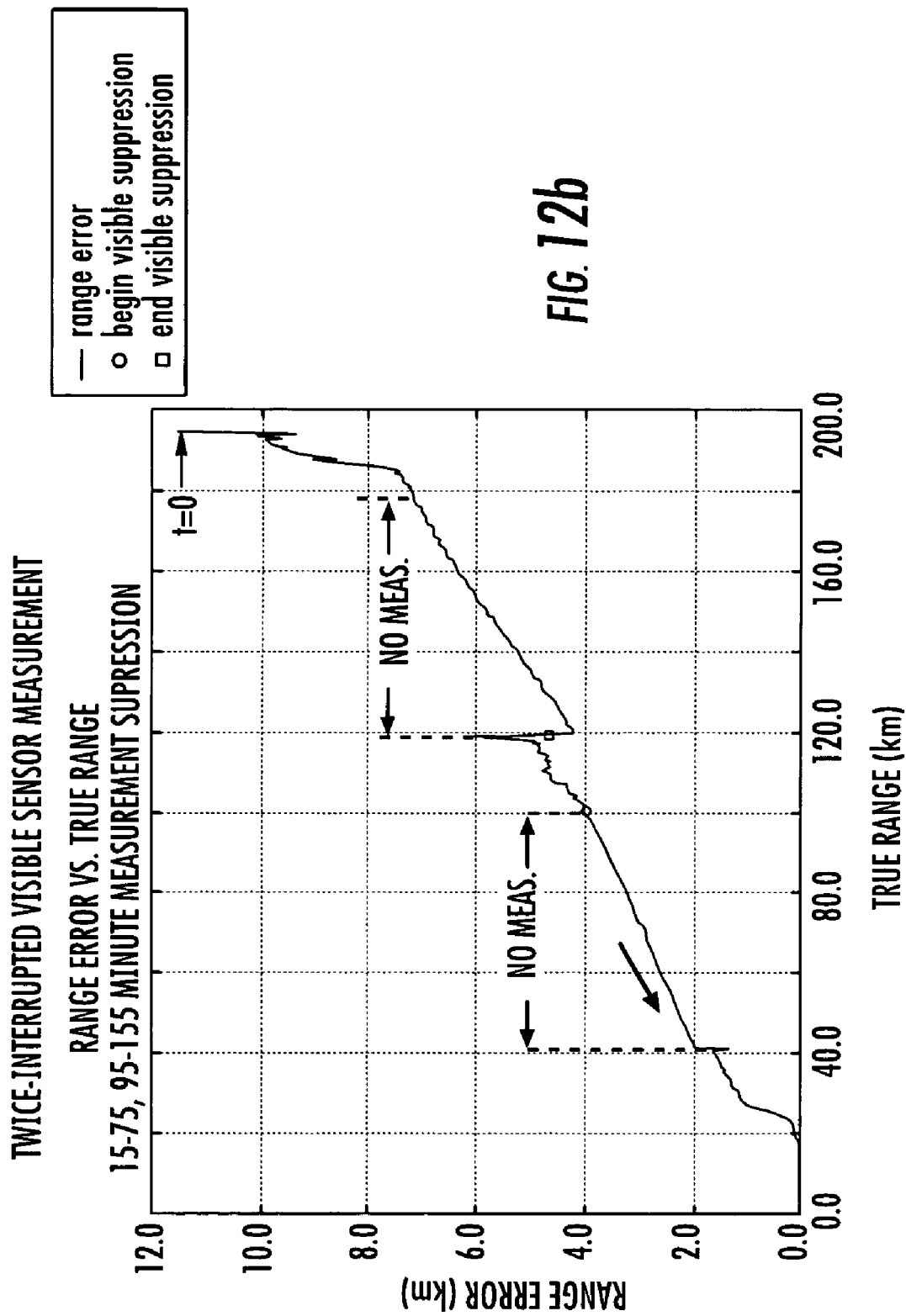
Figure 13A:
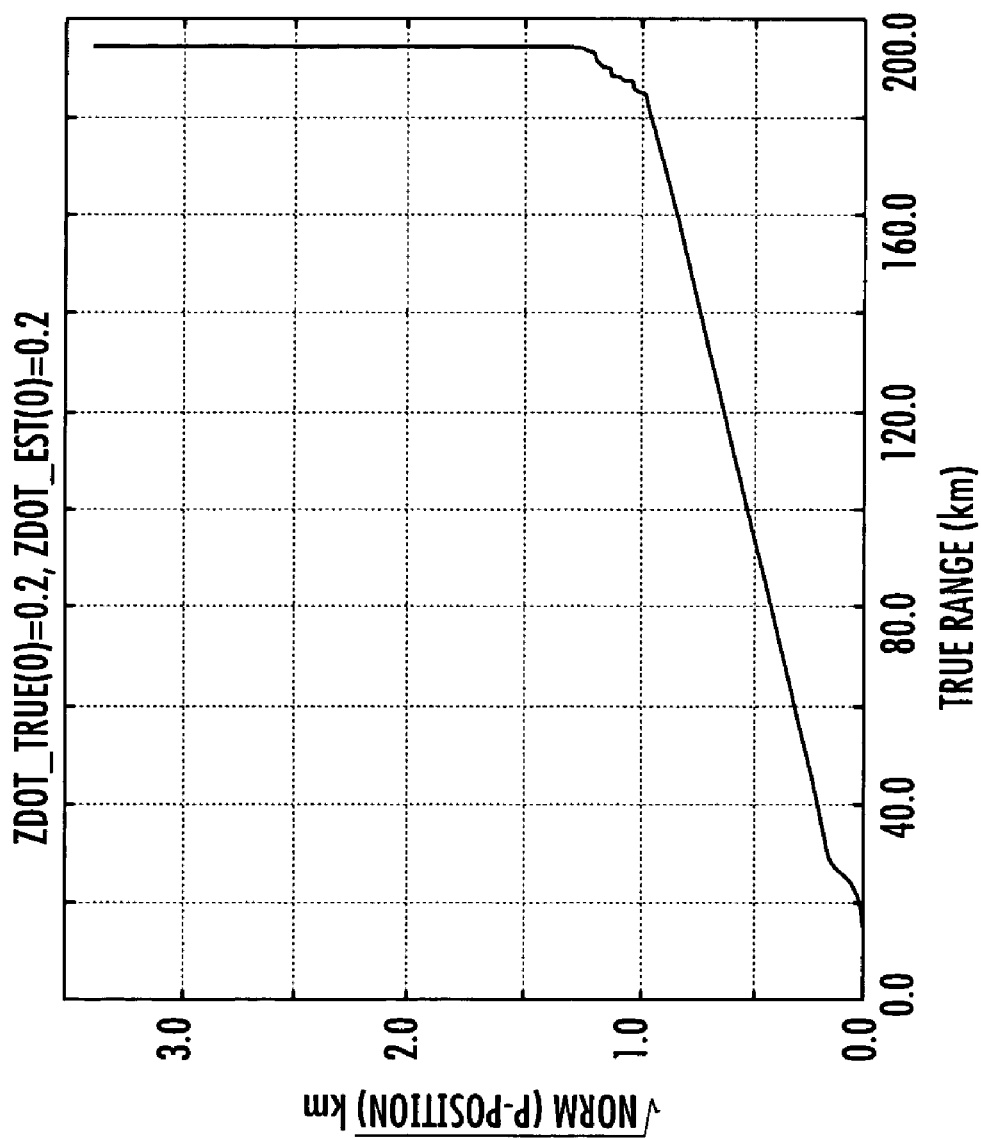
Figure 13B:
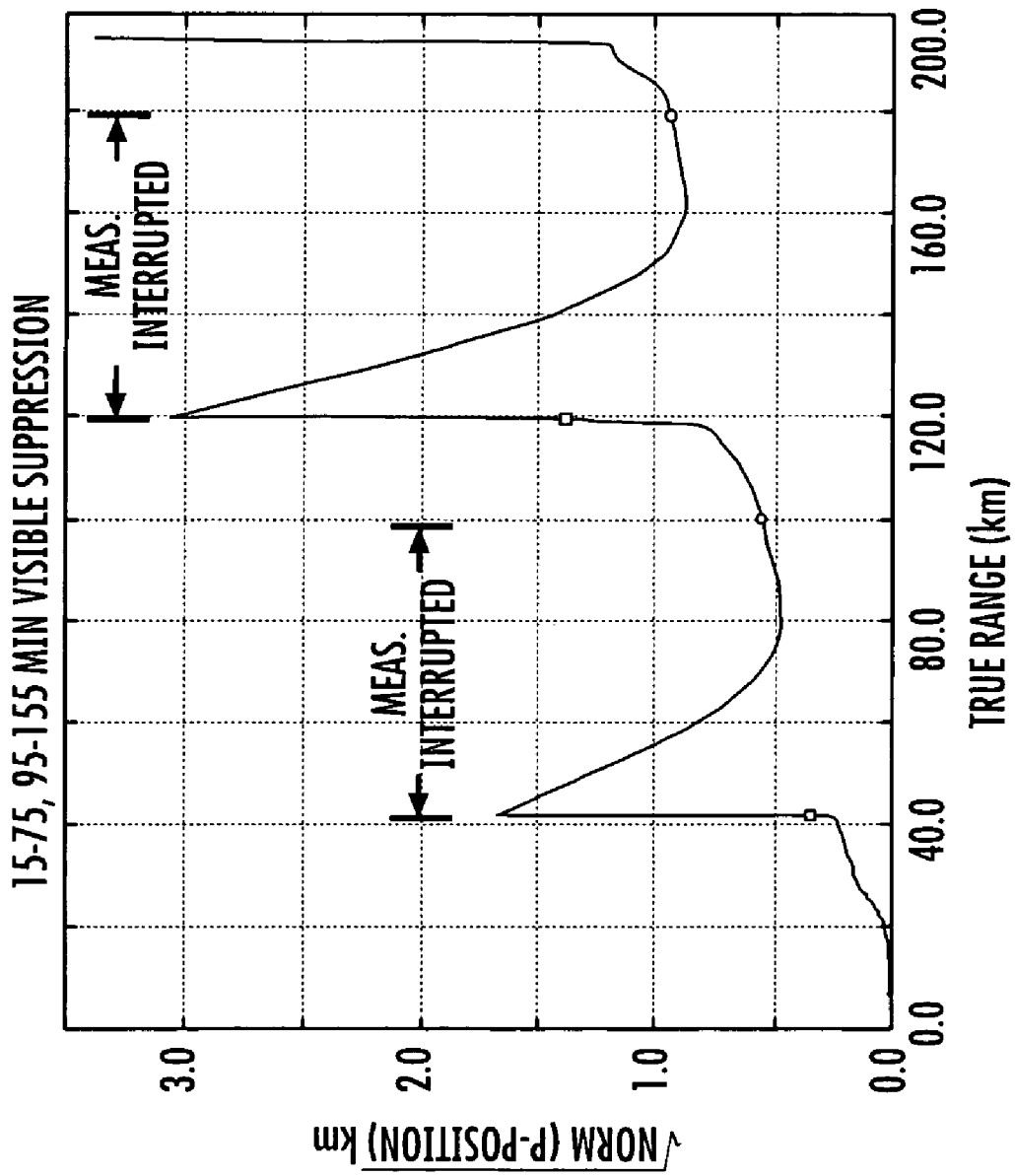
Figure 14A:
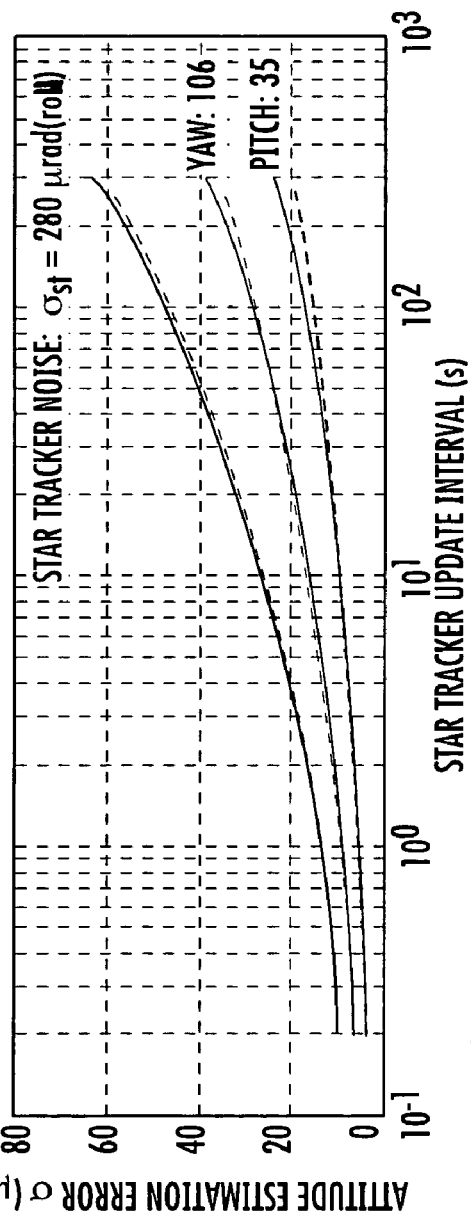
Figure 14B:
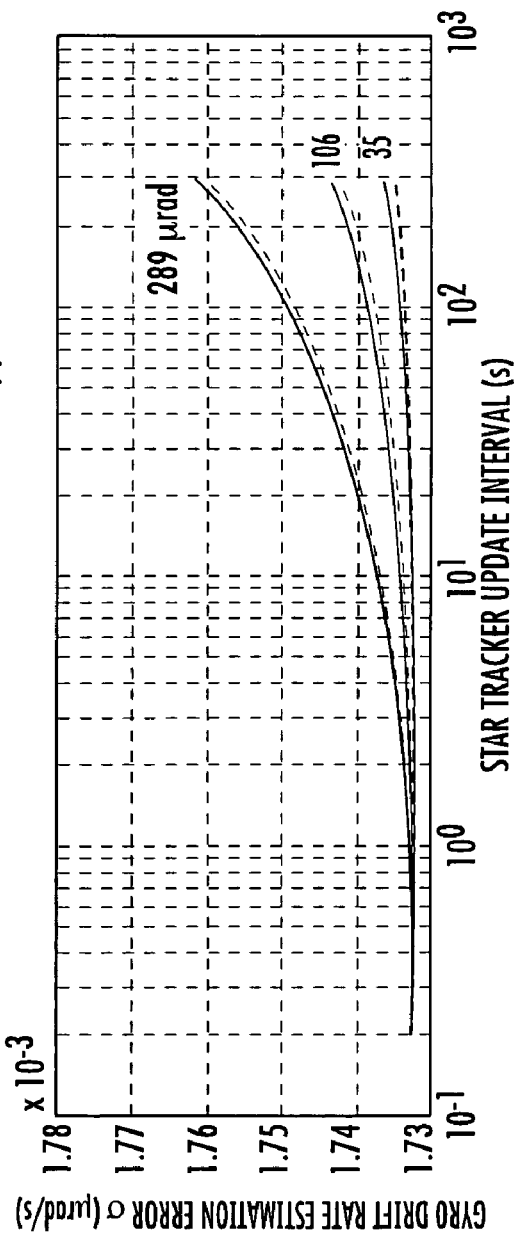
Figure 15A:
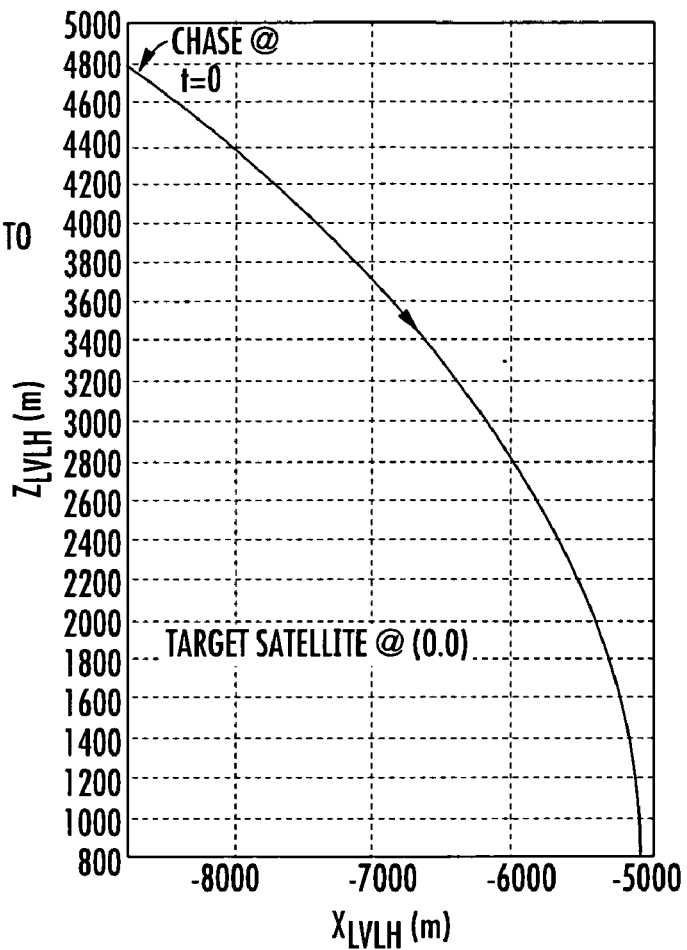
Figure 15B:
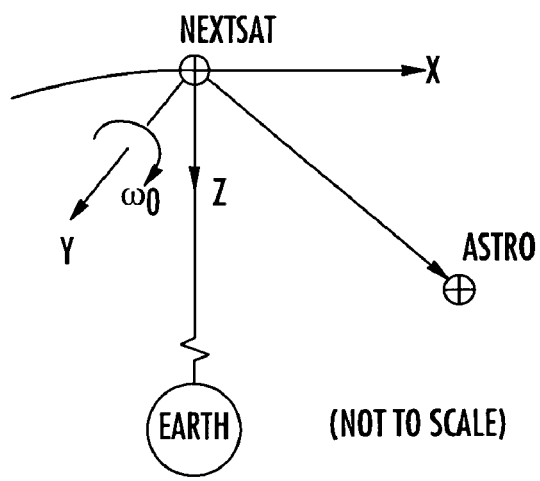
Figure 16A:
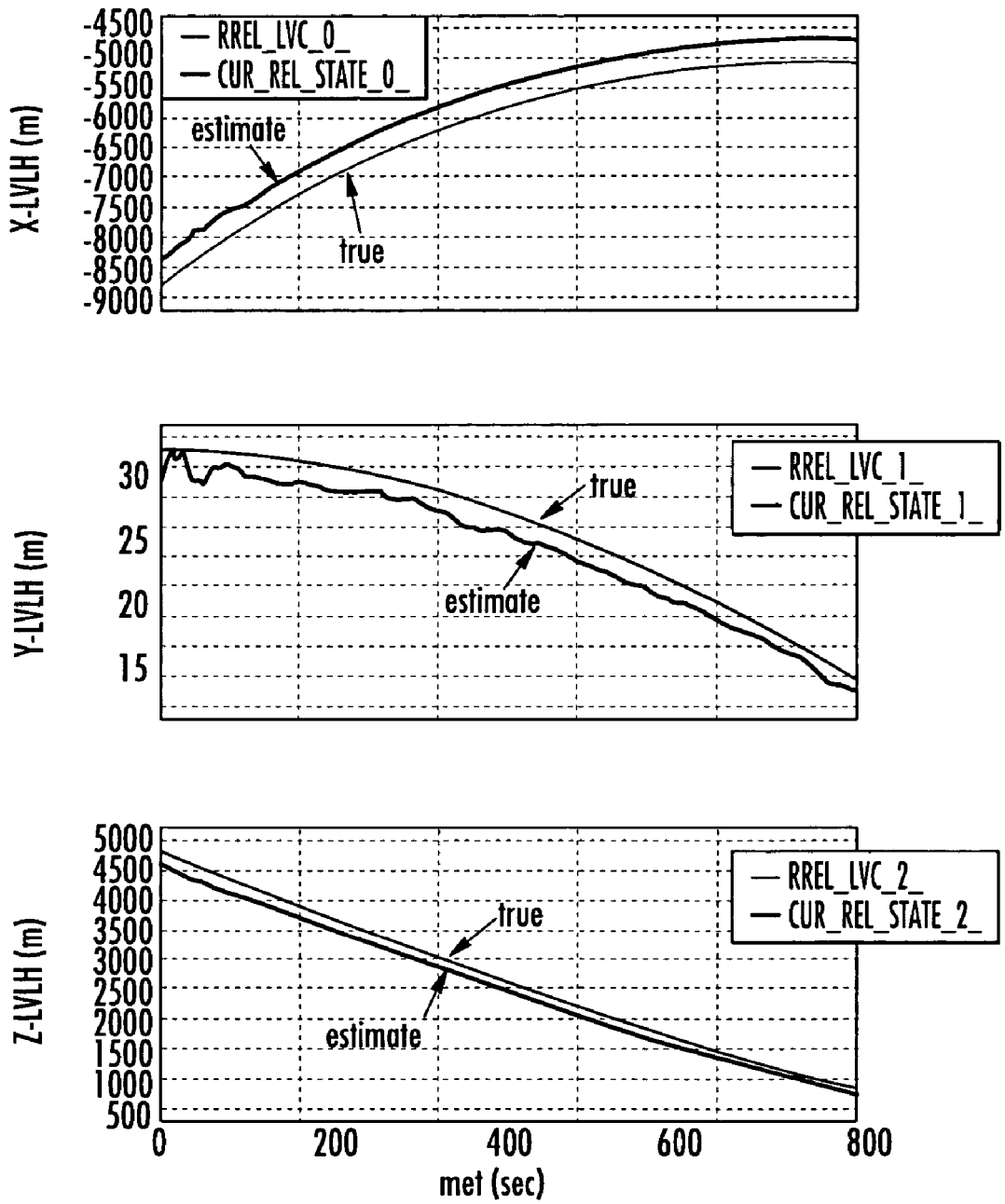
Figure 16B:
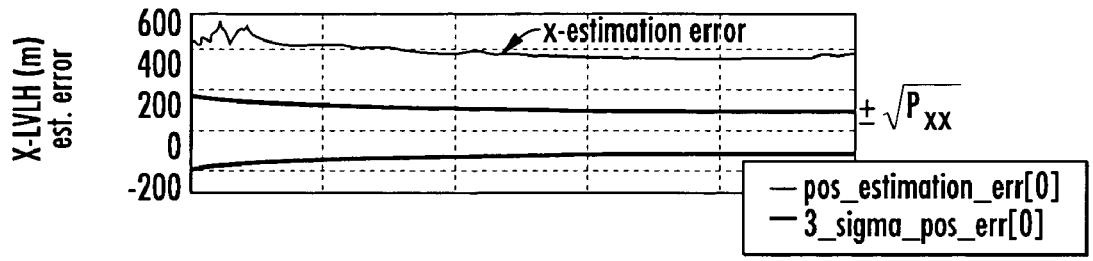
Figure 16B:
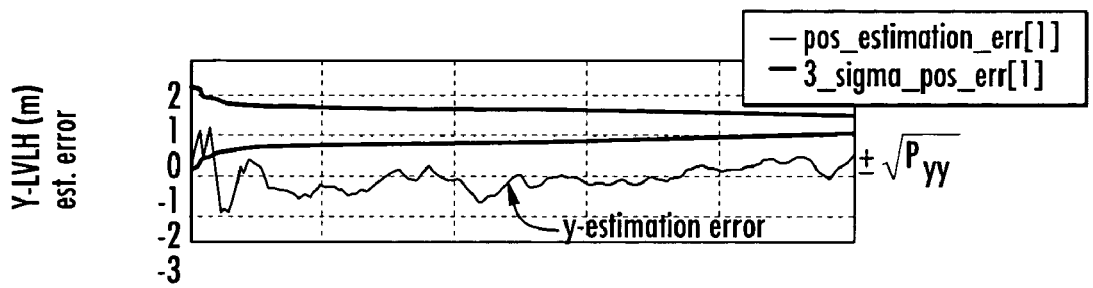
Figure 16B:
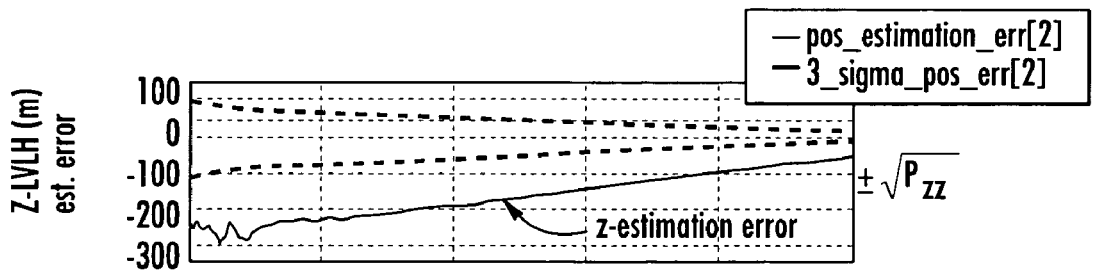
Figure 16B:
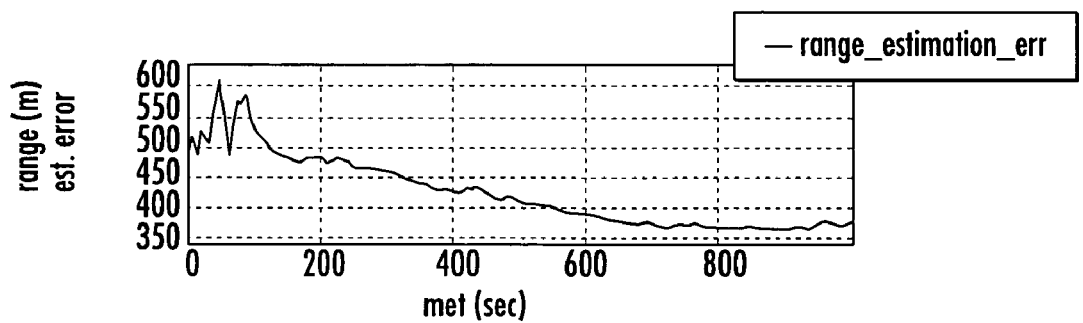
Figure 17:
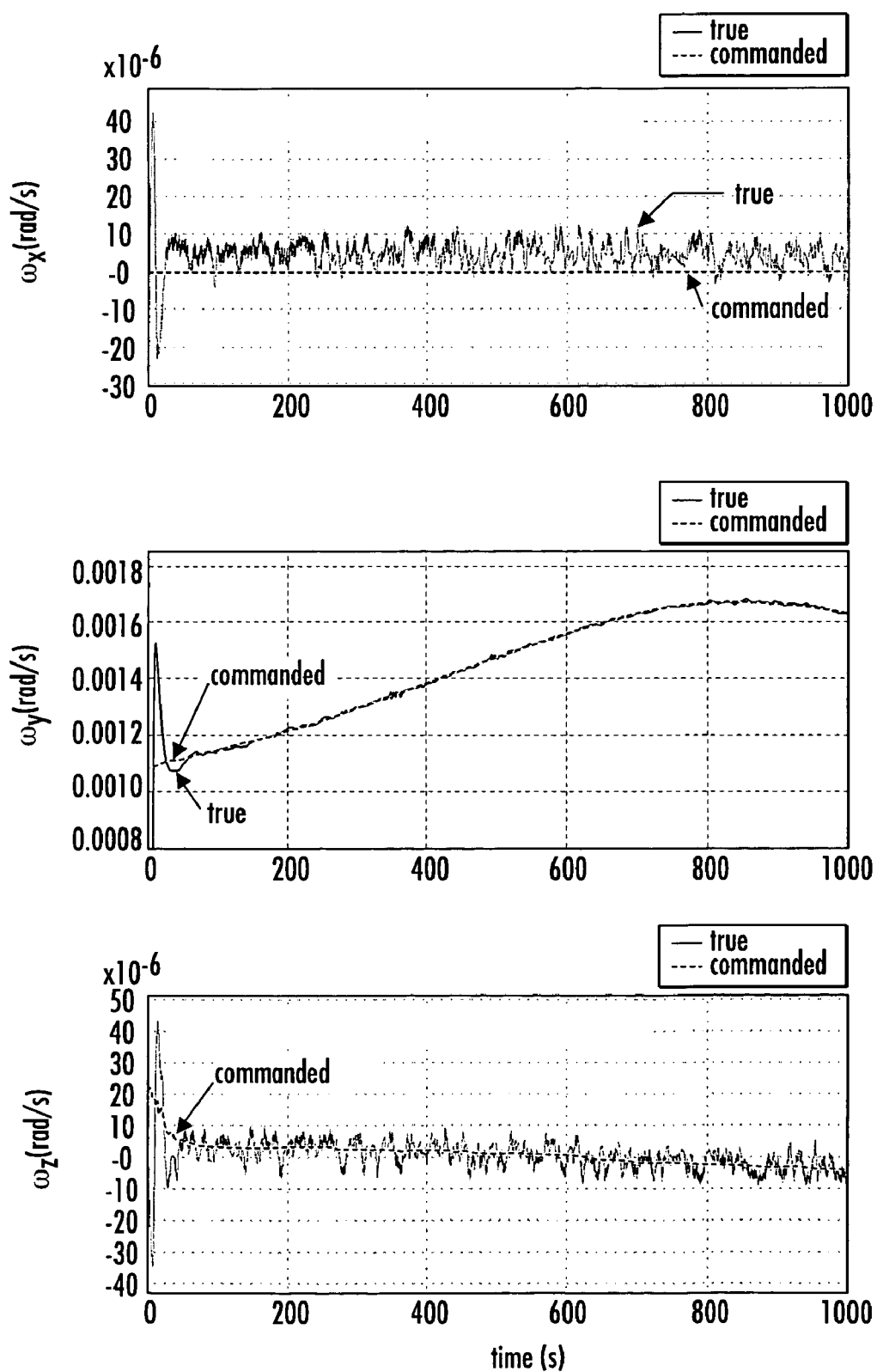
Figure 18A:
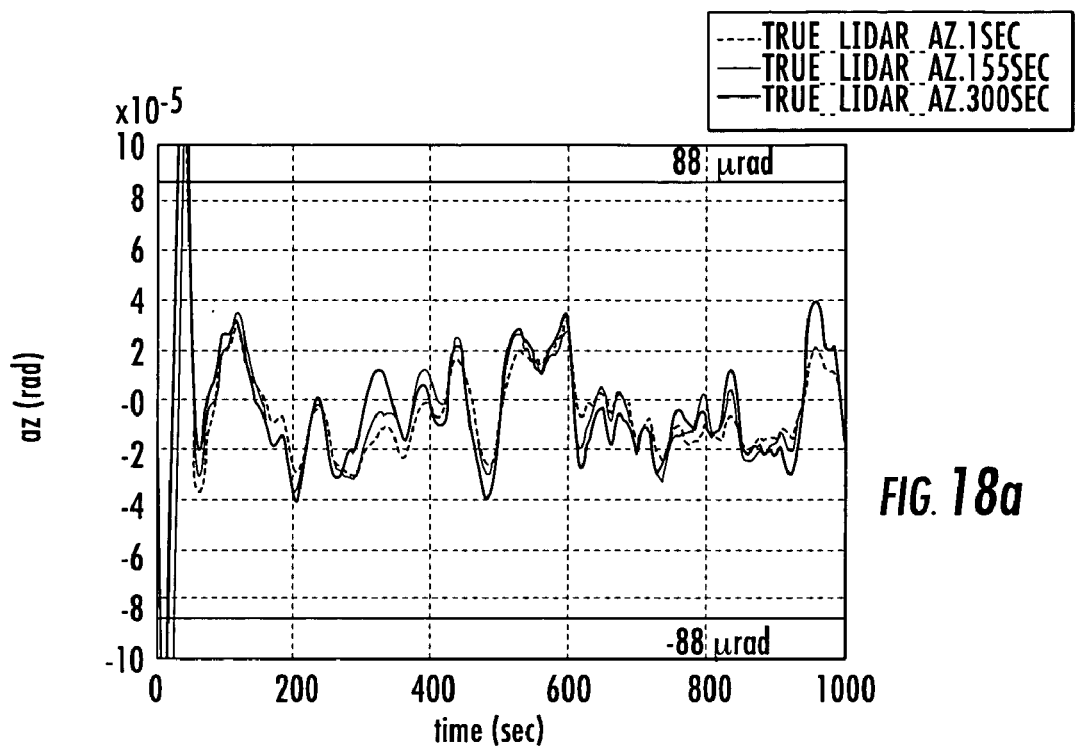
Figure 18B:
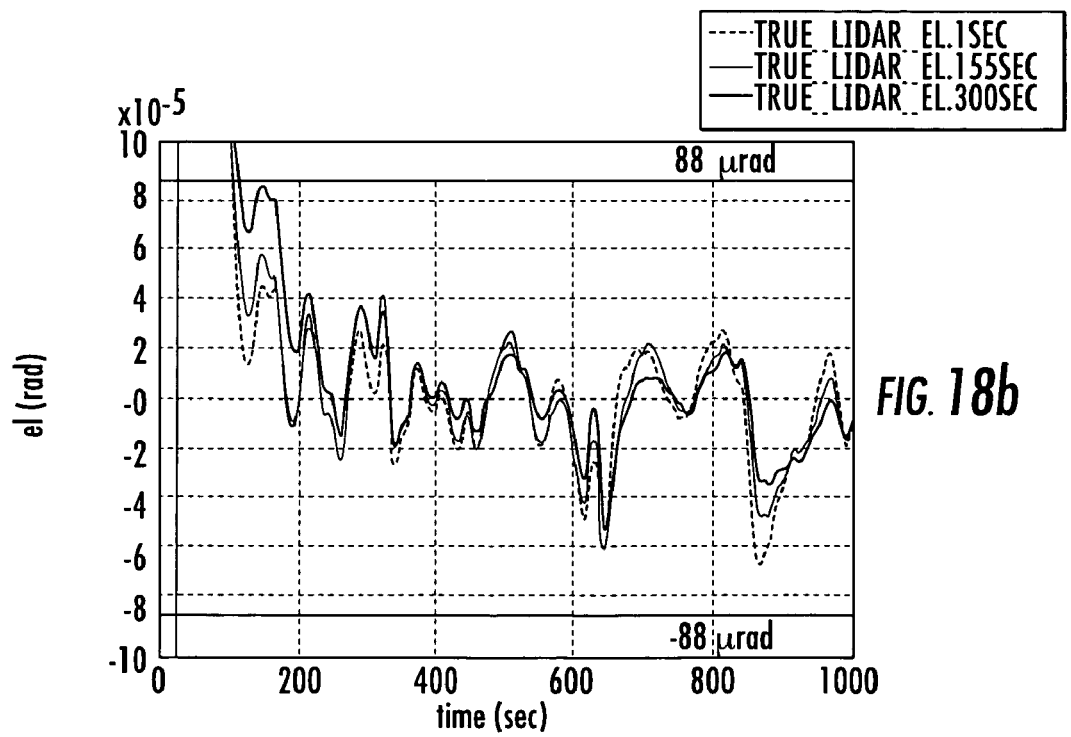
Figure 20A:
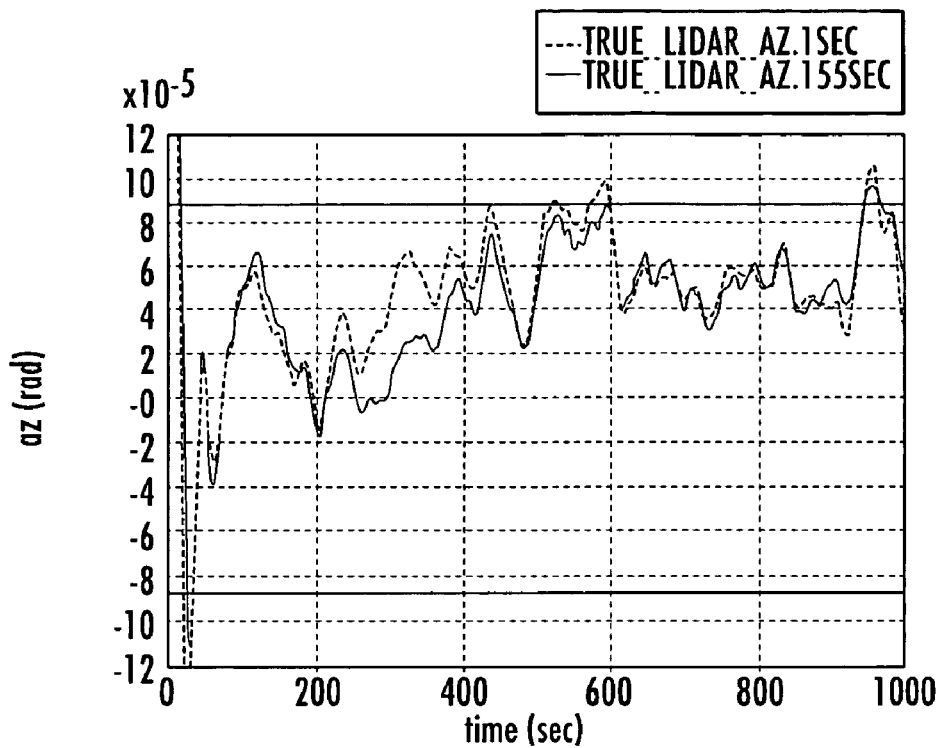
Figure 20B:
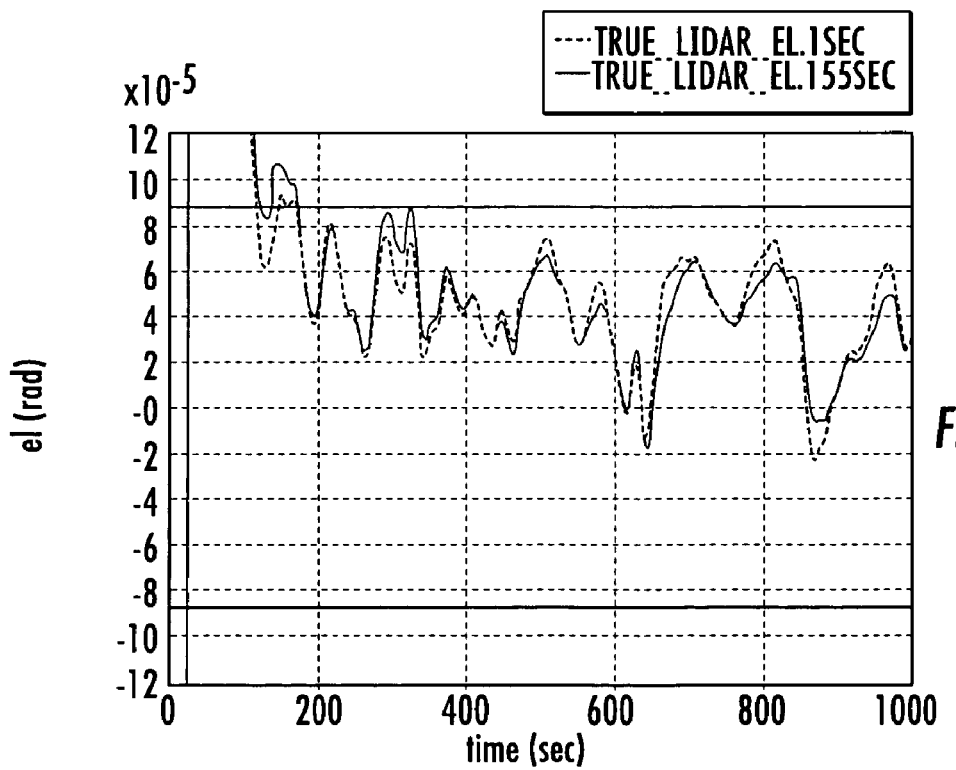
Figure 21:
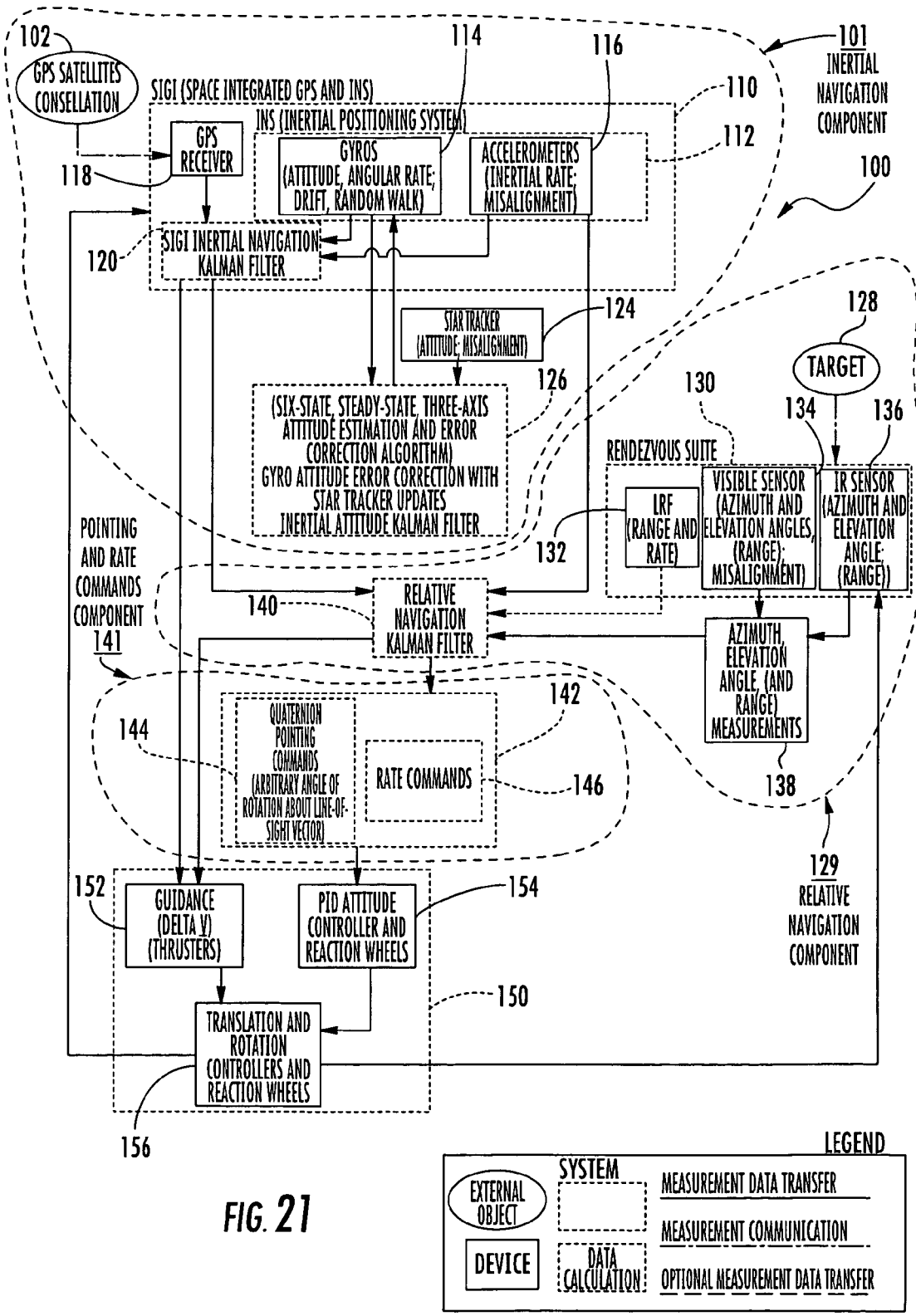

Having thus described the invention in general terms, reference will now be made to the accompanying drawings, which are not necessarily drawn to scale, and wherein:

FIG. 1 is a flow chart of a laser range finder pointing architecture of one embodiment of the present invention for a guidance, navigation, attitude determination and control architecture for autonomous rendezvous and proximity operation;

FIG. 2a is a flow chart of a guidance, navigation, attitude determination and control architecture for autonomous rendezvous and proximity operation of one embodiment of the present invention;

FIG. 2b is a flow chart of a more detailed inertial and relative navigation, guidance, attitude determination and control architecture for autonomous rendezvous and proximity operation of one embodiment of the present invention;

FIG. 3 is a process diagram for gyro measurements (k=0, 1, ..., n) at a uniform interval τ and star tracker measurements at a uniform interval T where T=n τ and where the nth gyro measurement coincides with a star tracker measurement or a propagated measurement for one embodiment of the present invention;

FIG. 4 is a pictorial diagram of true, measured and estimated single-axis attitudes before and after star tracker measurement in one embodiment of the present invention;

FIG. 5a is a pictorial diagram of a relative geometry of two satellites and a visible sensor focal plane;

FIG. 5b is a pictorial diagram of a local-vertical local-horizontal frame x y z for the motion of a chaser satellite;

FIG. 6 is a pictorial diagram of a timeline, beginning when a chaser satellite is 200 km behind and 8 km below a target satellite in one embodiment of the present invention;

FIG. 7a is a graph of guidance and relative navigation of true and estimated z versus x motion in a spacecraft orbital plane without visible sensor measurement interruptions for one embodiment of the present invention;

FIG. 7b is a graph of guidance and relative navigation of true and estimated z versus x motion in a spacecraft orbital plane with two visible sensor measurement interruptions of one hour each in one embodiment of the present invention;

FIG. 8a is a graph of true and measured line-of-sight angle without visible sensor measurement interruptions for one embodiment of the present invention;

FIG. 8b is a graph of true and measured line-of-sight angle with two visible sensor measurement interruptions for one embodiment of the present invention;

FIG. 9a is a graph of true and measured line-of-sight angle estimation error without visible sensor measurement interruptions for one embodiment of the present invention;

FIG. 9b is a graph of true and measured line-of-sight angle estimation error with two visible sensor measurement interruptions of one hour each for one embodiment of the present invention;

FIG. 10a is a graph of x-estimation error versus time without visible sensor measurement interruptions for one embodiment of the present invention;

FIG. 10b is a graph of x-estimation error versus time with two visible sensor measurement interruptions of one hour each for one embodiment of the present invention;

FIG. 11a is a graph of z-estimation error versus time without visible sensor measurement interruptions for one embodiment of the present invention;

FIG. 11b is a graph of z-estimation error versus time with two visible sensor measurement interruptions of one hour each for one embodiment of the present invention;

FIG. 12a is a graph of range estimation error versus range using azimuth and elevation measurements of a visible sensor without measurement interruptions using one embodiment of the present invention;

FIG. 12b is a graph of the range estimation error versus range using azimuth and elevation measurements of a visible sensor showing marginal effects of two one-hour visible sensor measurement interruptions using one embodiment of the present invention;

FIG. 13a is a graph of the square root of the norm of a relative position error covariance matrix versus range without visible sensor measurement interruptions using one embodiment of the present invention;

FIG. 13b is a graph of the square root of the norm of a relative position error covariance matrix versus range with two visible sensor measurement interruptions of one hour each, using one embodiment of the present invention;

FIG. 14a is a graph of roll, pitch, and yaw attitude estimation errors before and after star tracker updates versus an update interval for one embodiment of the present invention;

FIG. 14b is a graph of drift rate estimation errors before and after star tracker updates versus an update interval for one embodiment of the present invention;

FIG. 15a is a graphical scenario of the chaser satellite heading toward a target satellite at the origin (0,0) to test pointing accuracy of one embodiment of the present invention;

FIG. 15b is a pictorial scenario showing the relative position of an ASTRO (a chaser satellite) with respect to a NEXTSat (a target satellite) in local-vertical-local-horizontal frame to test pointing of one embodiment of the present invention;

FIG. 16a shows graphs for true and estimated relative position of a chaser satellite with respect to a target satellite in a local-vertical-local-horizontal frame using a relative state filter with star tracker intervals of 15 seconds and a gyro drift rate estimate equal to 10% of the true drift rate in one embodiment of the present invention;

FIG. 16b shows graphs of the position estimation error of a relative state filter with star tracker intervals of 15 seconds and a gyro drift rate estimate equal to 10% of the true drift rate in one embodiment of the present invention;

FIG. 17 are graphs of commanded and actual inertial angular velocities of a chaser satellite tracking a target satellite using one embodiment of the present invention;

FIG. 18 shows graphs of azimuth and elevation of target motion in a visible sensor focal plane to achieve pointing accuracy for laser rangefinder when all sensors are aligned perfectly, using one embodiment of the present invention;

FIG. 19 is a graph of azimuth and elevation motion of the target image on the visible sensor focal plane when the visible sensor boresight and laser rangefinder beam are aligned perfectly but gyros are misaligned by 2 or 5 mrad and a star tracker is misaligned by –2 or –5 mrad, respectively, in two different embodiments of the present invention;

FIG. 20 is a graph of azimuth and elevation versus time of a target image sensed by a visible sensor when this sensor is misaligned by 500 μrad, the laser rangefinder by 550 μrad, the gyros by 1 mrad, and the star tracker by –1 mrad using one embodiment of the present invention; and FIG. 21 is a flow chart of a method for and system of a closed-loop autonomous navigation control architecture of one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While a primary use of the present invention is in the field of spacecraft rendezvous, it will be appreciated from the following description that the invention is also useful for autonomous formation flights and autonomous spacecraft docking. The terms spacecraft, satellite, and space vehicle are used interchangeably throughout this application to refer to a body in space, including but not limited to satellites, shuttles, space stations, rockets, and other orbiting spacecraft. The term circular orbit is also meant to include a near circular orbit.

The following references are cited herein and are incorporated by reference:

Ref. 1, Hablani, H. B., Tapper, M. L., and Dana-Bashian, D. J., *Guidance and Relative Navigation for Autonomous Rendezvous in a Circular Orbit*, 25 AIAA J. Guidance, Control, and Dynamics 3, pp. 553–62 (2000);

Ref. 2, Markely, F. L., and Reynolds, R. G., *Analytic Steady-State Accuracy of a Spacecraft Attitude Estimator*, 23 AIAA J. Guidance, Control, and Dynamics 6, pp. 1065–67 (2000);

Ref. 3, Wu, Y.-W., Li, R., and Robertson, A. D., *Precision Attitude Determination for GOES N Satellites*, AAS 03-002;

Ref. 4, Bryson, A. E., Jr., *Control of Spacecraft and Aircraft*, ch. 1 (Princeton University Press 1994);

Ref. 5, Reynolds, R. G., *Quaternion Parameterization and a Simple Algorithm for Global Attitude Estimation*, 21 AIAA J. Guidance, Control, and Dynamics 4, pp. 669–71 (1998);

Ref. 6, Markley, F. L., *Fast Quaternion Attitude Estimation form Two Vector Measurements*, 25 AIAA J. Guidance, Control, and Dynamics 2, pp. 411–14 (2002);

Ref. 7, Shneydor, N. A., *Missile Guidance and Pursuit Kinematics, Dynamics and Control*, Appendix A, pp. 217–18 (Horwood Publishing 1998);

Ref. 8, Chen, C. T., *Introduction to Linear System Theory*, Holt, Rinehart and Winston, Inc., New York, 1970, Sec. 5.4;

Ref. 9, Bar-Shalom, Y., Rong Li, X., and Kirubarajan, T., *Estimation With Applications to Tracking and Navigation*, John Wiley and Sons, New York, 2001, Sec. 3.7;

Ref. 10, Fogel, E., and Gavish, M., "*n-th Dynamics Target Observability From Angle Measurements*", 24 IEEE Trans. on Aerospace and Electronic Systems, pp. 305–308 (May 1988);

Ref. 11, Kailath, T., *Linear Systems*, ch. 2 (Prentice-Hall 1996);

Ref. 12, Mullins, L. D., *Initial Value and Two Point Boundary Value Solutions to the Clohessy-Wiltshire Equations*, 40 J. Astronautical Sciences 4, pp. 487–501 (October–December 1992); and Ref. 13, Bialke, W., *High Fidelity Mathematical Modeling of Reaction Wheel Performance*, AAS 98-063, pp. 483–96.

Laser Range Finder Pointing Architecture

Range measurement may be effected with a laser range finder (LRF). However, because of the narrow beam of an LRF and according to current estimates, a laser range finder typically is pointed at a target satellite at a distance of 10 km with the precision of 90 μrad per axis, 1σ. The target may be first acquired with a narrow field-of-view visible camera. The visible camera and the laser range finder may be collimated. Although there may be slight misalignment between the two boresights, this misalignment generally is calibrated within an accuracy of 20 μrad (about one-fourth of the pointing accuracy requirement). The visible camera may provide the azimuth and elevation angle measurements that are used to point the camera and the laser range finder at the target within the pointing accuracy required for the laser range finder. The LRF may then measure the range of the target periodically as desired, depending on the magnitude of the range estimation error variance.

The visible camera may continue to track the target satellite in a closed-loop system of one example embodiment of the present invention using the quaternion and angular rate commands described more fully herein. These commands require a relative position vector $\underline{r}_{CT}$ from chaser to target and a relative velocity vector $\underline{\dot{r}}_{CT}$. Because these vectors are not exactly known, they may be estimated using a relative six-state navigation Kalman filter described more fully herein. If the target satellite is in a circular orbit and is passive (that is, the target neither helps nor hinders an attempt to rendezvous with the target) and if the chaser satellite is sufficiently close to the target satellite such that the arc separation between the two vehicles is less than the angle measurement noise of the visible camera, then the relative Kalman filter may be based on the linear, time-invariant Clohessy-Wiltshire equations. One such filter is described in Ref. 1. If the relative distance is too large to effectively use the linear, time-invariant Clohessy-Wiltshire equations, the relative navigation may be based on a relative inertial motion formulation in an inertial frame.

One example embodiment of the present invention of the architecture required for pointing a visible camera with precision and tracking the target is shown in FIG. 1. The attitude of the chaser spacecraft, quaternion q in FIG. 1, is determined by using gyros and a star tracker ($q_{gyro/ST}$). A periodic correction of gyro-measured attitude is performed with star tracker measurements and a six-state Kalman filter for attitude determination. The delta-velocity ($\Delta \underline{V}$) firings to bring the chaser satellite closer to the target satellite, according to guidance algorithms described in Ref. 1 or other guidance algorithms, are measured by the accelerometer and inputted to a different six-state Kalman filter for estimated relative position ($\hat{\underline{r}}$) and velocity ($\hat{\underline{\dot{r}}}$) propagation. The gyros and accelerometers may be part of the SIGI (Space Integrated GPS/INS) navigation system for the chaser satellite. The covariance matrices of the inertial position, velocity, attitude and rate errors are considered in the six-state relative navigation Kalman filter. The attitude and rate ($\underline{q}$, $\underline{\omega}$) of the chaser spacecraft track the quaternion commands and rates ($\underline{q}_C$, $\underline{\omega}_C$), respectively. A proportional-integral-and-derivative (PID) attitude controller, with gains $K_P$, $K_I$, and $K_D$, and reaction wheels as actuators are used to track the quaternion commands and rate commands.

As shown in FIG. 1, different components of a closed-loop control system may operate at different frequencies. The frequency for a component may be any frequency that provides effective communication with the interlinked components; the frequencies presented in FIG. 1 and throughout this application are meant only as examples and are not intended as limiting the underlying present invention. Also, in the exemplary embodiments of the present invention and associated equations, the chaser is usually treated as a finite body with attitude, and the target satellite is treated as a point mass.

Another embodiment of the present invention is presented in FIG. 2a as a closed-loop concatenation of component technologies. A more detailed embodiment of the present invention is presented in FIG. 2b. Inertial navigation of the chaser satellite, and feeding the estimates of satellite position, velocity, attitude and rates and their variances to the relative navigation component in the inertial or relative frame of the target satellite are shown in greater detail in FIG. 2b. The examples of LRF pointing technology presented subsequently do not utilize the inertial relative navigation shown in FIG. 2b; instead, they are based on relative navigation in local-vertical-local-horizontal frame and Clohessey-Wiltshire equations. This illustrates that a specific component technology developed and illustrated herein as a part of the laser range finder pointing technology is replaceable by a different component technology if it serves the same purpose, albeit possibly with different accuracies. The following are descriptions of various component technologies of embodiments of the present invention.

Analytic Steady-State Three-Axis Attitude Determination

A six-state, steady-state, analytical Kalman filter of one embodiment of the present invention estimates three-axis attitude of a chaser satellite with respect to an inertial or local-vertical-local-horizontal (LVLH) frame using gyros and a star tracker. A specific embodiment may estimate attitude of a line-of-sight or visible sensor of a chaser satellite Therefore, this component technology is presented first. The present invention provides an analytical technique and algorithm for correcting gyro errors using star tracker measurements for three-axis attitude determination. Space Integrated GPS/INS (SIGI) gyros and star trackers may determine the focal plane attitude in the inertial frame. Gyro measurements are corrupted with noise, drift and random walk error, while star tracker measurements are corrupted with noise only.

The noise, drift and random walk in the SIGI gyro measurements are corrected periodically with the star tracker measurements. For this purpose, a single-axis analysis of a Kalman filter for gyro error corrections, as presented in Ref. 2, is modified for a three-axis application. Though this pairing of hardware is conventional, the Kalman filtering of the present invention and described herein is unique in that the gyro-measured spacecraft attitude is blended with a time-matched star tracker measured attitude, and three-axis attitude estimation errors are calculated analytically before and after star tracker updates. The small three-axis attitude estimation error is separated from the large three-axis gyro and star tracker measurements and then the analytic, steady-state, attitude determination Kalman filter optimally updates the large three-axis gyro measurements and suppresses the inherent random walk and drift in the measurements. This analytically solved attitude Kalman filter facilitates a selection of the optimum star tracker measurement interval and star tracker orientation with respect to the spacecraft axes, as provided further with respect to, for example, star tracker measurement interval T, parameters $S_e$, $S_v$, and $S_u$, $\zeta$, and $\sigma_{st}$, Eqs. (16a), (16b), (16c), (17a), and FIGS. 14a and 14b. One example embodiment of an analytical attitude determination technology of the present invention is provided below.

FIG. 3 illustrates a process of measuring spacecraft attitude with a gyro at an interval of $\tau$ at $t=k\tau$ ($k=1,2, \ldots, n$) and with a star tracker at an interval of $T=n\tau$. This process is provided in Ref. 2. The index k is reinitialized to 0 when it is equal to n. The three-axis incremental angle $\Delta\underline{\phi}_k$ measured by gyros during the interval $t_{k-1} \leq t \leq t_k$ is $$\Delta\underline{\phi}_k = \Delta\underline{\theta}_k + \tau\underline{b}_k + \underline{\beta}_k + \underline{q}_k \quad (1)$$

where $\Delta\underline{\theta}_k$ is the true change in the spacecraft attitude, equal to $$\Delta\underline{\theta}_k = \int_{t_{k-1}}^{t_k} \underline{\omega} dt = \tau\underline{\omega}_{k-1} \quad (2)$$

The gyro sample period $\tau$ is sufficiently small so that the above integration is correct. In the subsequent equation, $\underline{\omega}$ represents the spacecraft angular rate, $\underline{b}$ is the drift rate of the gyro, $\underline{\beta}_k$ is a zero-mean noise in the measurement arising from a 3×1 random walk rate $\underline{n}_v$ (t) and a 3×1 drift acceleration $\underline{n}_u$ so that $\underline{\beta}_k$ is $$\underline{\beta}_k = \int_{(k-1)\tau}^{k\tau} \underline{n}_v(t)dt + \int_{(k-1)\tau}^{k\tau}(k\tau - t)\underline{n}_u(t)d\tau \quad (3)$$

Its variance is a 3×3 diagonal matrix in which each element will appear as $$\sigma_\beta^2 = \sigma_v^2 \tau + \sigma_u^2 \tau^3/3 \quad (4)$$

where $\sigma_v^2$(rad²/s) and $\sigma_u^2$(rad²/s³) are power spectral densities of the scalar elements of $\underline{n}_v$ and $\underline{n}_u$. See Ref. 2. The 3×1 vector $\underline{q}_k$ in Eq. (1) is a non-additive quantization noise in the measurement. It is non-accumulative in that each successive addition of the angle $\Delta\underline{\phi}_k$ does not cause this noise to accumulate, as does the noise $\underline{\beta}_k$. Although a quantization noise is not a white noise, it is treated so here and regarded as a readout noise of power spectral density equal to $\sigma_e^2 = q^2/12$ where q denotes the angle per quantum signal of the gyro.

In the duration, $t_{k-1} \leq t \leq t_k$, the drift rate $\underline{b}$ may also change, and this change is modeled, in vector notations, as $$\underline{b}_k = \underline{b}_{k-1} + \underline{\alpha}_k \quad \underline{\alpha}_k = N(\underline{0}, \underline{\sigma}_\alpha) \quad (5)$$

where $\underline{\alpha}_k$ is a zero mean, discrete random rate noise vector equal to $$\underline{\alpha}_k = \int_{(k-1)\tau}^{k\tau} \underline{n}_u(t)dt \quad (6)$$

and the variance of each of its element is $\sigma_\alpha^2 = \sigma_u^2 \tau$. See Ref. 2.

The estimate of the incremental angle $\Delta\underline{\theta}_k$, denoted $\Delta\hat{\underline{\theta}}_k$, is obtained from the gyro output $\Delta\underline{\phi}_k$; thus $$\Delta\hat{\underline{\theta}}_k = \Delta\underline{\phi}_k - \tau\hat{\underline{b}}_k \quad (7a)$$

$$\hat{\underline{b}}_k = \hat{\underline{b}}_{k-1} \quad (7b)$$

where $\hat{\underline{b}}_k$ is the estimate of the drift rate $\underline{b}_k$, estimated with the aid of star tracker measurements. See Ref. 2.

Inertial attitude of the spacecraft is obtained recursively as follows $$\hat{\underline{C}}_{kI} = \hat{\underline{C}}_{k,k-1}\hat{\underline{C}}_{k-1,I} \quad (8)$$

where, in terms of $\Delta\hat{\underline{\theta}}_k$ and its antisymmetric matrix counterpart $\Delta\hat{\underline{\theta}}_k^x$, the incremental direction cosine matrix is $$\hat{\underline{C}}_{k,k-1} = \underline{1} - \Delta\hat{\underline{\theta}}_k^x + [\Delta\hat{\underline{\theta}}_k \Delta\hat{\underline{\theta}}_k^T - \|\Delta\hat{\underline{\theta}}_k\|^2 \underline{1}]/2 \quad (9)$$

and $\underline{1}$ is a 3×3 identity matrix. In Eq. (8), $\hat{\underline{C}}_{kI}$ is the estimate of the spacecraft attitude $\underline{C}_{kI}$ at $t=t_k$ relative to an inertial frame. When k=n, one or more star trackers provide spacecraft attitude equal to $\underline{C}_{n.st,I}$ relative to the inertial frame. This involves a 3×1 star tracker angle noise vector, $\underline{v}_{st}$; thus $$\underline{C}_{n.st,I} = (\underline{1} - \underline{v}_{st}^x)\underline{C}_{nI} \quad (10)$$

where $\underline{C}_{nI}$ is the true spacecraft attitude at k=n, and $t=t_n$. The three elements of the zero-mean random Gaussian noise vector $\underline{v}_{st}$ may all be different, depending on the number of star trackers and their orientations relative to the spacecraft axes. The low- and high-frequency spatial noise in star tracker measurements (Ref. 3) may be ignored, as it is in this embodiment of the present invention.

Because of the noise, drift and random walk errors, the gyro measurements are updated using star tracker measurements.

Ref. 2 shows that, in single-axis, the steady-state correction of the gyro-measured attitude with star tracker measurements at k=n may be performed as follows. Let $\hat{\theta}_n \triangleq \hat{\theta}_0(-)$ be the gyro estimated spacecraft attitude just prior to the star tracker measurement, and let $\theta_{st}$ be the spacecraft attitude measured by the star tracker at that instant. Then the estimate $\hat{\theta}_0(-)$ is corrected to $\hat{\theta}_0(+)$ such that $$\hat{\theta}_0(+) = \hat{\theta}_0(-) + (1-\zeta^{-2})[\theta_{st} - \hat{\theta}_0(-)] \quad (11)$$

where the parameter $\zeta$ is defined below. Recall that the subscript n is replaced with 0 and the star tracker update is performed periodically at k=n with the period T=nτ.

A three-axis equivalent of Eq. (11) is developed as follows. Eq. (8) provides the gyro estimated spacecraft attitude $\hat{\underline{C}}_{n.gyro,I}$ at k=n, where the subscript gyro is added to distinguish this attitude matrix from the star tracker measured attitude matrix $\underline{C}_{n.st,I}$ given by Eq. (10). Similar to Eq. (10), the gyro estimated inertial attitude has an accumulated estimation error equal to $\underline{v}_{n.gyro}$, and, therefore, $$\hat{\underline{C}}_{n.gyro,I} = (\underline{1} - \hat{\underline{v}}_{n.gyro}^x)\underline{C}_{nI} \quad (12)$$

Since the true attitude $\underline{C}_{nI}$ is unknown, the estimation error angle $\hat{\underline{v}}_{n.gyro}$ is also unknown.

The three axis equivalent of the quantity $\theta_{st} - \hat{\theta}_0(-)$ in Eq. (11) is $$\theta_{st} - \hat{\theta}_0(-) \Leftrightarrow \underline{C}_{n.st,I}\hat{\underline{C}}_{I,n.gyro} \quad (13a)$$

$$\approx \underline{1} - (\underline{v}_{st} - \hat{\underline{v}}_{n.gyro})^x \quad (13b)$$

$$\triangleq \underline{1} - \hat{\underline{v}}_{st/gyro}^x \quad (13c)$$

Since both $\underline{C}_{n.st,I}$ and $\hat{\underline{C}}_{n.gyro,I}$ are known, the multiplication in (13a) may be performed and the small angle error vector $\hat{\underline{v}}_{st/gyro}$ defined by Eqs. (13b) and (13c) may be calculated. The error angle $\underline{v}_{st/gyro}$ is a 3×1 relative error angle vector between the star tracker measurements and the gyro-estimated attitude.

To incorporate the star tracker update factor $(1-\zeta^{-2})$ of Eq. (11) in the three-axis attitude estimation technique, it is recognized that the parameter $\zeta$, defined later, depends on the star tracker measurement noise for the axis at hand. Hence, each of the three elements $v_{st/gyro,\alpha}$ ($\alpha$=x,y,z) of $\underline{v}_{st/gyro}$ is corrected to $(1-\zeta_\alpha^{-2})v_{st/gyro,\alpha}$. To abbreviate notations, introduce $$\underline{v}_{st/update} \triangleq \begin{bmatrix} (1-\zeta_x^{-2}) \; v_{st/gyro,x} \\ (1-\zeta_y^{-2}) \; v_{st/gyro,y} \\ (1-\zeta_z^{-2}) \; v_{st/gyro,z} \end{bmatrix}$$

Then, the following three-axis equivalent of Eq. (11) can be written by inspection.

$$\hat{\underline{C}}_{0.gyro,I}(+) = [\underline{1} - \underline{v}_{st/update}^x]\hat{\underline{C}}_{n.gyro,I} \quad (14)$$

A single-axis equivalent of the above correction process is graphically presented in FIG. 4.

With regard to the gyro bias and using a single-axis update model of Ref. 2, the three-axis update of the bias vector $$\hat{b}_n \triangleq \hat{b}_0(-)$$

is $$\hat{b}_0(+) = \hat{b}_0(-) - \begin{bmatrix} S_{u,x}(\zeta_x T) - 1 & v_{st/gyro,x} \\ S_{u,y}(\zeta_y T) - 1 & v_{st/gyro,y} \\ S_{u,z}(\zeta_z T) - 1 & v_{st/gyro,z} \end{bmatrix} \quad (15)$$

where the dimensionless parameter $S_u$ (of which there are three, one for each axis) is defined below.

To compare gyro noise with the star tracker noise, Ref. 2 introduces the following three dimensionless parameters for each axis of the spacecraft readout noise: $S_e = \sigma_e/\sigma_{st}$ (16a)

random walk noise: $S_v = T^{1/2}\sigma_v/\sigma_{st}$ (16b)

drift angle: $S_u = T^{3/2}\sigma_u/\sigma_{st}$ (16c)

The parameter $\zeta$ is defined in terms of the above three dimensionless parameters $$\zeta = \gamma + \frac{1}{4}S_u + \frac{1}{2}\left(2\gamma S_u + S_v^2 + \frac{1}{3}S_u^2\right)^{1/2} \text{ where} \quad (17a)$$

$$\gamma = \left(1 + S_e^2 + \frac{1}{4}S_v^2 + \frac{1}{48}S_u^2\right)^{1/2} \geq 1 \quad (17b)$$

In the above algorithm, a six-state Kalman filter is literally solved. The covariances of the attitude and bias estimation errors and their correlation are incorporated herein from Ref. 2.

Relative Navigation

A relative navigation extended Kalman filter (EKF) of one embodiment of the present invention provides the position and velocity estimates of a chaser satellite relative to a target satellite required for the calculation of pointing and rate commands for tracking the target and guidance delta-velocities for rendezvous and proximity operations.

The optimum three-axis spacecraft local-vertical local-horizontal (LVLH) attitude estimate, determined from the previous section, is used recursively in a six-state relative navigation extended Kalman filter (EKF) of one embodiment of the present invention. This relative navigation Kalman filter uses the line-of-sight (LOS) azimuth and elevation angle measurements from the visible sensor focal plane.

The measurements for a relative navigation filter of one embodiment of the present invention come from two sources: the Space Integrated GPS/INS (SIGI) gyros and accelerometers for inertial navigation of the chaser satellite and a rendezvous sensor suite including visible and infrared sensors and a laser range finder. The visible and infrared sensors provide angular location of the target relative to their focal plane frame. To achieve the tight pointing accuracy, this relative navigation filter takes into account the visible sensor focal plane offset from the chaser satellite center of mass and the known misalignment between the visible sensor and the LRF.

A relationship is established between partial derivatives of the focal plane angle measurements and relative position of the target explicitly through the three-axis gyro/star tracker estimated attitude transformation matrix. One embodiment of focal plane and range measurements of the present invention are provided below.

FIG. 5a illustrates relative geometry of chaser and target satellites, a focal plane of an imaging sensor of the chaser satellite, and an image of a target satellite on the focal plane. Because of tracking errors, the target image may not be at the center of the focal plane. Instead, it may be at nonzero azimuth and elevation angles with respect to the center of the focal plane. Let the line-of-sight (LOS) vector $\underline{l}$, expressed in the misaligned sensor frame $F'_S$, have the components $\underline{l}^{F'_S} = [x'_S y'_S z'_S]^T$. The line-of-sight (LOS) angle measurements, then, are related to the components of $\underline{l}$ by azimuth $\alpha_m = \alpha + v_\alpha = \tan^{-1}(y'_S, x'_S) + v_\alpha$ (18a)

elevation $\epsilon_m = \epsilon + v_\epsilon = \tan^{-1}(-z'_S, x'_S) + v_\epsilon$ (18b)

These angles are small, much less than 1 rad, so that the target image remains within the field-of-view of the sensor. The quantities $v_\alpha$ and $v_\epsilon$ are zero mean, random white noise in the measurements. Using these measurements, the chaser spacecraft may be accurately pointed to the target so that a collimated laser beam from a laser range finder (LRF) can impinge upon the target satellite and determine the relative range of the target. This range measurement is modeled as $$r_m = \|\underline{l}\| + v_r \quad (19)$$

where $v_r$ is a zero-mean range measurement white noise.

Using these angle measurements and, when available, a range measurement, a Kalman filter may estimate position and velocity of the target satellite relative to the chaser satellite. The orbital motion of the two satellites that may be expressed in Cartesian frames governs the relative position and velocity. At short distances between the two satellites, the relative motion may be modeled by Clohessey-Wiltshire (CW) equations which involve the relative position vector $\underline{r}_{CW}$ from the target satellite mass center to the chaser satellite mass center and its time derivatives. See Ref. 4. Clohessey-Wiltshire equations are valid for a target satellite in a circular orbit and a chaser satellite in proximity (~10 km) such that the orbital arc separation between the two satellites is less than the standard deviation of the angle measurement noise $v_\alpha$ and $v_\epsilon$ introduced above. The relative position vector $\underline{r}_{CW}$ is expressed in the target LVLH orbit frame $F_0$, and, therefore, $\underline{r}_{CW}$ is related to the previously introduced position vectors and transformation matrices as follows $$\underline{r}^{F_0}_{CW} = -\underline{C}_{01}\underline{C}_{1b}\left(\underline{C}_{bs}\underline{C}_{ss'}\underline{l}^{F'_s} + \underline{r}^{Fb}_{off}\right) = -\underline{C}_{0I}\underline{r}^{FI}_{CT} \quad (20)$$

where $\underline{C}_{1b}$ is the transformation matrix from the chaser body frame to the chaser LVLH frame $F_1$. $\underline{C}_{01}$ transforms a vector in the frame $F_1$ to the target LVLH frame $F_0$ and $\underline{C}_{0I}$ transforms a vector in an inertial frame to the frame $F_0$. The negative signs in the right sides of Eq. (20) arise because the vector $r_{CW}$ is from the target satellite to the chaser satellite, not from the chaser satellite to the target satellite. These matrices will be determined by the chaser satellite navigation and attitude determination system (as shown in the previous section) and initial ground tracking of the target satellite. Thus, navigation and attitude determination errors will affect the implementation of the earlier equations.

Because the line-of-sight (LOS) vector $l^{F's}$ in Eq. (20) equals $$[x'_s \ y'_s \ z'_s]^T,$$

the vector $$r_{CW}^{F_0}$$

is related to the measurements $\alpha_m$, $\epsilon_m$, and $r_m$. Specifically, since this embodiment of the present invention uses an extended Kalman filter (EKF), the following partial derivatives of the arctan functions in the measurement Eqs. (18) and (19) are required $$\frac{\partial \alpha}{\partial l} = \left[\frac{\partial \alpha}{\partial x'_s} \ \frac{\partial \alpha}{\partial y'_s} \ \frac{\partial \alpha}{\partial z'_s}\right]^T = [-y'_s \ x'_s \ 0]^T / (x'^2_s + y'^2_s) \quad (21)$$

$$\frac{\partial \epsilon}{\partial l} = \left[\frac{\partial \epsilon}{\partial x'_s} \ \frac{\partial \epsilon}{\partial y'_s} \ \frac{\partial \epsilon}{\partial z'_s}\right]^T = [z'_s \ 0 \ -x'_s]^T / (x'^2_s + z'^2_s)$$

$$\frac{\partial l}{\partial l} = \left[\frac{\partial l}{\partial x'_s} \ \frac{\partial l}{\partial y'_s} \ \frac{\partial l}{\partial z'_s}\right]^T = [x'_s \ y'_s \ z'_s]^T / l$$

where the LOS range $l$ is equal to $\|l\|$ and the superscript T denotes transpose of the vector. In Eq. (21), the derivative of a scalar with respect to a vector is expressed in the form of a column vector instead of a row vector. The extended Kalman filter requires partial derivatives of $\alpha$, $\epsilon$ and $l$ with respect to the vector $$r_{CW}^{F_0}.$$

Considering Eq. (20), we obtain $$\frac{\partial \alpha}{\partial r_{CW}} = -C_{0s'} \frac{\partial \alpha}{\partial l} \quad (22a)$$

$$\frac{\partial \epsilon}{\partial r_{CW}} = -C_{0s'} \frac{\partial \epsilon}{\partial l} \quad (22b)$$

$$\frac{\partial l}{\partial r_{CW}} = -C_{0s'} \frac{\partial l}{\partial l} \quad (22c)$$

where $C_{0s'} = C_{01} C_{1b} C_{bs} C_{ss'}$. Defining the state vector of the extended Kalman filter as $$[r_{CW}^T, \dot{r}_{CW}^T]^T$$

and the measurement vector $$z = [\alpha_m \ \epsilon_m \ r_m]^T,$$

the corresponding linearized (3×6) measurement matrix $H$ is $$H = \begin{bmatrix} \left(\frac{\partial \alpha}{\partial r_{CW}}\right)^T \\ \left(\frac{\partial \epsilon}{\partial r_{CW}}\right)^T \\ \left(\frac{\partial l}{\partial r_{CW}}\right)^T \end{bmatrix} \quad 0_{3 \times 3} \quad (23)$$

where $0_{3 \times 3}$ is a 3×3 null matrix. This $H$ matrix is used in the extended Kalman filter. Because the matrices $C_{01}$ and $C_{1b}$ are determined by a navigation system including gyros, accelerometers, and a GPS receiver, the performance of the Kalman filter is influenced by navigation errors.

Pointing and Rate Commands

A succinct three-axis attitude and rate command component of one embodiment of the present invention is disclosed, based on Refs. 5, 6 and 7, that (1) provides quaternion pointing commands to acquire and track a target satellite and command a visible sensor boresight, initially oriented in any direction in an inertial frame, to point at the target satellite; and (2) provides angular rate commands to track the target satellite with a tighter pointing accuracy than without rate commands.

The relative position of a target estimated for relative navigation establishes the commanded line-of-sight (LOS) vector orientation of the visible sensor boresight. Commanded line-of-sight (LOS) vector orientations lead to quaternion pointing commands. See Refs. 5, 6. The disclosed quaternion commands of one embodiment of the present invention include an arbitrary angle of rotation about the line-of-sight (LOS) vector for Sun-pointing of solar arrays, and account for the offset of the sensors from the center of mass of the chaser satellite and misalignment of the sensor frames relative to the chaser satellite frame. The angular rate command for tracking a target satellite of one embodiment of the present invention uses the estimates of both relative position and velocity from the Relative Navigation Kalman filter of one embodiment of the present invention, and its formulation is based on Ref. 7.

Using these pointing commands and associated rate commands in an embodiment of the present invention of a concatenation of component navigation technologies that account for navigation and attitude determination errors, a proportional-integral-derivative (PID) attitude controller may point the visible sensor at a target spacecraft in a circular orbit with a pointing accuracy of 90 μrad or more tightly. This accuracy may be required to impinge upon a target with a narrow beam of a collimated laser range finder (or misaligned by an angle known within some precision, possibly 20 μrad) to measure the relative range to the target.

Example embodiments for deriving quaternion pointing commands and angular rate commands are provided below.

FIG. 5a shows a target satellite in a circular orbit. The local-vertical local-horizontal (LVLH) frame at the target satellite location is denoted $F_0$. FIG. 5a also shows a chaser satellite in a different orbit, and the local-vertical local-horizontal (LVLH) frame at the location of the chaser satellite is denoted $F_1$. Quaternion pointing commands of one embodiment of the present invention are attitude commands for a chaser satellite to orient the boresight of an optical or infrared sensor at a target satellite. The optical sensor may be misaligned from its ideal orientation relative to the chaser satellite body frame. The misalignment angles may be determined through calibration. Let $F_S$ and $F'_S$ be the ideal and the misaligned frames of the sensor, respectively, and let $C_{SS'}$ transform a vector in $F'_S$ to the frame $F_S$. In the misaligned frame $F'_S$: $x'_S y'_S z'_S$, the boresight of the sensor is along the $x'_S$ axis. The objective is to point the visible sensor boresight at the target satellite. Let $\underline{b}$ be a unit vector along the boresight axis. Then, in the frame $F'_S$: $\underline{b}^{F'S}[1\ 0\ 0]$. This unit vector is transformed to the chaser body frame $F_b$ via the transformation matrix $\underline{C}_{SS'}$ and the matrix $\underline{C}_{bs}$ between the ideal sensor frame $F_S$ and the chaser satellite frame $F_b$. Thus the boresight unit vector $\underline{b}$ in the frame $F_b$ is $$\underline{b}^{F_b} = \underline{C}_{bs} C_{SS} \underline{b}^{F'S} \quad (24)$$

The inertial position of the center of mass of the target satellite is denoted $\underline{r}_0$, and the inertial position of the center of mass of the chaser satellite is denoted $\underline{r}_1$. The relative vector $\underline{r}_{CT}$ from the chaser center of mass to the target center of mass, expressed in an inertial frame, is given by $$\underline{r}_{CT}^{F_I} = -\underline{r}_1^{F_I} + \underline{r}_0^{F_I} \quad (25)$$

where $\underline{r}_1$ and $\underline{r}_0$ are expressed in the inertial frame $F_I$. In the embodiment of the present invention shown in FIG. 5a, the optical sensor is located at an offset vector, $\underline{r}_{off}$, from the chaser center of mass. Thus, the line-of-sight vector from the center of the focal plane of the chaser to the target is given by $\underline{l} = \underline{r}_{CT} - \underline{C}_{Ib} \underline{r}_{off}$, where $\underline{C}_{Ib}$ is the transformation matrix from the chaser body frame $F_b$ to the inertial frame $F_I$. A unit vector $\underline{u}$ along this line-of-sight vector is given by $$\underline{u}^{F_I} = \underline{l}/\|\underline{l}\| \quad (26)$$

Assuming that the boresight unit vector $\underline{b}^{F_b}$ is known in the chaser body frame and the line-of-sight (LOS) unit vector $\underline{u}^{F_I}$ is known in the inertial frame, the quaternion command $q_{cI}$ that transforms the unit vector $\underline{u}^{F_I}$ into the boresight unit vector $\underline{b}^{F_b}$ is given by $$q_{cI} = \frac{1}{\sqrt{2(1+\underline{b}\cdot\underline{u})}}\left[(\underline{b}\times\underline{u})\cos\frac{\phi}{2} + (\underline{b}+\underline{u})\sin\frac{\phi}{2}, (1+\underline{b}\cdot\underline{u})\cos\frac{\phi}{2}\right] \quad (27)$$

where the subscript cI implies a transformation from the inertial to the commanded chaser body frame, and $\phi$ is a roll angle about the boresight or line-of-sight (LOS) vector for pointing the solar arrays to the Sun. See Refs. 5, 6. Even though the vectors $\underline{b}$ and $\underline{u}$ in Eqs. (24) and (26) are in different frames, the vector operation in Eq. (27) occurs as though $\underline{b}$ and $\underline{u}$ were in the same frame, implying that the spacecraft body frame $F_b$ is initially aligned with the inertial frame and the command quaternion $q_{cI}$ will rotate the sensor boresight to point at the target.

The angle $\phi$ for the roll angle about the boresight or line-of-sight (LOS) vector may be utilized to orient the solar arrays normal to the Sun. The degree of freedom in the quaternion pointing commands of angle $\phi$ allow the architecture of a navigation system of the present invention to simultaneously point a visible sensor towards a target satellite while maintaining solar arrays of the chaser satellite normal to the Sun. Sun-pointing commands may include both pitch and roll commands for the solar array controllers.

To obtain angular rate commands, the line-of-sight (LOS) vector $\underline{l}^{F_I}$ from the center of the focal plane of the chaser to the target mass center given above is transformed to the chaser spacecraft body frame, to get $$\underline{l}^{F_b} = \underline{r}_{CT}^{F_b} - \underline{r}_{off}^{F_b} \quad (28)$$

The relative inertial velocity of the target with respect to the chaser satellite is $$\dot{\underline{r}}_{CT}^{F_I} = \dot{\underline{r}}_0^{F_I} - \dot{\underline{r}}_1^{F_I} \quad (29)$$

where a dot (•) over a vector represents the inertial derivative of the vector. The relative inertial velocity may be estimated using a Kalman filter. In the chaser body frame, this relative inertial velocity vector will be $$\dot{\underline{r}}_{CT}^{F_b} = \underline{C}_{bI} \dot{\underline{r}}_{CT}^{F_I}.$$

The inertial velocity of the body-fixed vector $$\underline{r}_{off}^{F_b}$$

in the chaser frame $$F_b \text{ is } \dot{\underline{r}}_{off}^{F_b} = \omega_{bI} \times \underline{r}_{off}^{F_b}$$

where $\underline{\omega}_{bI}$ is the inertial angular velocity of the chaser body frame. The inertial velocity of the line-of-sight vector $\underline{l}^{F_b}$ is then $$\dot{\underline{l}}^{F_b} = \underline{C}_{bI} \dot{\underline{r}}_{CT}^{F_I} - \omega_{bI} \times \underline{r}_{off}^{F_b} \quad (30)$$

Knowing $\underline{l}^{F_b}$, the inertial angular velocity of the line-of-sight (LOS) vector $\underline{l}^{F_b}$ is given by $$\underline{\omega}_{cI} = \underline{l}^{F_b} \times \dot{\underline{l}}^{F_b}/(\underline{l}\cdot\underline{l}) \quad (31)$$

$\underline{\omega}_{cI}$ is the rate command for the chaser body frame expressed in the current body frame. See Ref. 7. The quaternion pointing command, Eq. (27), and the angular rate command, Eq. (31), may be used to acquire and track a target satellite, as described with respect to a closed-loop laser range finder pointing architecture as one embodiment of the present invention.

Observability of Range from Angle Measurements

In the first part of this section, it is shown that the relative range of a target satellite is observable from the azimuth and elevation angle measurements of an embodiment of the present invention formulated in a previous section, provided that there is a nonzero relative altitude between the two satellites. In the second part of this section, the consequences of interruption of the angle measurements are determined. The angle measurements of the visible sensor may be interrupted when the target satellite is in shadow and the Sun's rays do not illuminate the target. If the visible sensor measurements are interrupted for a finite duration, the variance of the position estimation error grows. Because of the stringent pointing accuracy required for a laser range finder and the ensuing complexities, the present invention ensures that the closed-loop system will continue to perform if the observability of relative range from visible and infrared sensor focal plane angle measurements is impaired, and that the system resumes fully when the target is regained.

When the line-of-sight (LOS) angle measurements resume, the relative position vector range is rendered observable again, and the relative navigation Kalman filter quickly decreases the position (range) and velocity estimation errors to the no-interruption level as the chaser vehicle approaches the target satellite, that is the level the position and velocity errors would have been at that time if the line-of-sight measurements would not have been interrupted. Therefore, accurate range measurement from the laser range finder may not be required, resulting in a system that may cost less. Because the observability of range is through the arctan functional relationships between the coordinates [x y z] in the LVLH frame and angles, observability is not instantaneous or differential. See Ref. 8.

One embodiment of observability testing of the present invention is presented below to show that the relative position vector range is observable from angle measurements.

To examine observability of the relative range, the state space matrix associated with the Clohessey-Wiltshire (CW) equations is needed. FIG. 5b depicts a chaser vehicle in proximity of a target vehicle and illustrates the local-vertical local-horizontal (LVLH) frame $F_0$: x, y, z at the target mass center, where x is along the velocity vector, z points to the center of mass of the Earth, and y is normal to the orbit plane, completing the right handed triad; see also FIG. 5a. The chaser is located at (x, y, z) and its relative inertial velocity in the LVLH frame is $[u\ v\ w]^T$ where $u=\dot{x}-\omega z$, $v=\dot{y}$, and $w=\dot{z}+\omega x$, and $(-\omega)$ is the orbital angular velocity of the target satellite about the y-axis. See Ref. 4. The cross-track motion y normal to the orbit plane is decoupled from the two-dimensional (x, z) motion in the orbit plane. For simplicity, this example only presents the coupled in-plane motion. The 4×1 state vector $\underline{x}=[u\ w\ x\ z]^T$ is governed by a first-order state-space equation. See Ref. 4. The associated 4×4 state-space matrix $\underline{A}$ is $$\underline{A} = \begin{bmatrix} 0 & \omega & -\omega^2 & 0 \\ -\omega & 0 & 0 & 2\omega^2 \\ 1 & 0 & 0 & \omega \\ 0 & 1 & -\omega & 0 \end{bmatrix} \quad (32)$$

A visible sensor mounted on the chaser satellite senses the target satellite, and measures the location of the centroid of the target image on the focal plane. For this example, the two vehicles are assumed to be sufficiently close together so the LVLH frame $F_1$ at the chaser satellite center-of-mass shown in FIG. 5a may be parallel to the frame $F_0$: x y z. The line-of-sight (LOS) unit vector defined by the focal plane measurements in the focal plane coordinates is transformed into the LVLH frame $F_1$. In the $F_1$ frame, the pitch angle measurement associated with the relative altitude z, then, will be given by $$\theta_{y,m} = \tan^{-1}(-z/x) + v_y \quad (33)$$

where $v_y$ is a zero-mean white Gaussian measurement noise. Unlike azimuth and elevation angles of Eqs. (18), the pitch angle, Eq. (33), will be large. To use this nonlinear measurement in a Kalman filter framework, the Taylor series expansion for Eq. (33) about the estimated quantities is noted:

$$\theta_{y,m} \approx \tan^{-1}(-\hat{z}/\hat{x}) + \underline{H}(\underline{x}-\hat{\underline{x}}) + v_y \quad (34)$$

where, in standard Kalman filter notations, the symbol $(\hat{\cdot})$ denotes an estimate of the variable $(.)$ before measurement updates and the 1×4 row matrix $\underline{H}$ is defined by $$\underline{H} = \partial\theta_y/\partial\underline{x} = [0\ 0\ \hat{z}\ -\hat{x}]/\rho^2 \quad (35)$$

with $\rho^2 = \hat{x}^2 + \hat{z}^2$.

To determine observability of the range or in-track distance $x_0$ between the two vehicles from the nonlinear angle measurement $\theta_{y,m}$, the "maximum likelihood" estimation technique that operates on a batch of measurements may be used and the initial value of the coordinate vector $[x\ y\ z]^T$ may be estimated. See Ref. 9, 10. However, in this embodiment, observability is established using the state space matrix $\underline{A}$, Eq. (32), and the linearized measurement matrix $\underline{H}$, Eq. (35). See Ref. 8.

A linear time-invariant, nth-order deterministic system is observable if the rank of its n×n observability matrix $O_m$ involving $\underline{A}$ and $\underline{H}$ is n, or, equivalently, if the determinant $\underline{O}_m \neq 0$. For $\underline{A}$ and $\underline{H}$ shown above, the observability matrix $\underline{O}_m$ is $$\underline{O}_m = \rho^{-2} \begin{bmatrix} 0 & z & 2\omega x & -4\omega^2 z \\ 0 & -x & 2\omega z & \omega^2 x \\ z & \omega x & -2\omega^2 z & -\omega^3 x \\ -x & \omega z & -\omega^2 x & 2\omega^3 z \end{bmatrix} \quad (36)$$

and its determinant is $$\det O_m = 3\omega^4 z^2 (x^2 + 4z^2)/(x^2+z^2)^2 \quad (37)$$

which is not zero unless the relative altitude z=0. When z=0, the chaser and the target satellites are on the same orbit, the chaser either ahead or behind the target. In these instances, the pitch angle is either zero or $\pi$ rad, and it will not provide information concerning the relative distance between the chaser and the target satellite. Thus, for the range between the chaser satellite and the target satellite to be observable, the altitude z may not be zero.

The example observability test presented above does not explicitly determine the observable and the unobservable modes of natural motion of the chaser satellite in proximity of a passive target satellite. To do so, the eigenvector test of observability presented in Ref. 11 may be used, according to which, if $\underline{p}_i$ (i=1, . . . , n) is an eigenvector of the n×n state-space matrix $\underline{A}$, then, for scalar measurements ($\underline{H}$=1×n), the scalar $\underline{H}\underline{p}_i$ must be nonzero for observability of the vector $\underline{p}_i$. The relative motion of the chaser satellite consists of four modes: two complex conjugate modes associated with elliptic circumnavigation, a drift mode at a constant relative altitude, and a stationary mode at a constant angular distance from the target satellite in the same orbit. See Ref. 4. The example above only shows the stationary mode to be unobservable.

The two real eigenvectors, $\underline{p}_1$ and $\underline{p}_2$, associated with the two complex conjugate modes that govern elliptic circumnavigation are $\underline{p}_1 = [0\ \omega\ 2\ 0]^T$ and $\underline{p}_2 = [\omega\ 0\ 0\ 1]^T$. See Ref. 4. The corresponding $\underline{H}\underline{p}_1$ and $\underline{H}\underline{p}_2$ are $2z(x^2+z^2)^{-1}$ and $-x(x^2+z^2)^{-1}$ which are not zero simultaneously for an elliptic flyaround. Thus, the position vector during elliptic circumnavigation is observable from angle measurements. The station-keeping mode $\underline{p}_3$ at a constant x and zero z is $\underline{p}_3 = [0\ \omega\ 1\ 0]^T$. The corresponding $\underline{H}\underline{p}_3 = z/(x^2+z^2) = 0$ because z=0. Hence, as concluded earlier, the stationary mode is unobservable. The station-keeping mode and the drift mode are at a constant relative altitude both associated with a zero eigenvalue of multiplicity two. As such, the drift has the principal eigenvector $\underline{p}_3 = [0\ \omega\ 1\ 0]^T$ and a secondary eigenvector $\underline{p}_4 = [\omega/3\ 0\ 0\ 2/3]^T$. While $\underline{H}\underline{p}_3$ was just given, $\underline{H}\underline{p}_4 = -(2/3) \times (x^2+z^2)^{-1}$. Since the drift takes place at a constant nonzero relative altitude, $\underline{H}\underline{p}_4$ is nonzero, and, therefore, the drift mode is observable from angle measurements.

Thus, as shown by the analysis above, so long as there is a relative altitude between the chaser and target satellites, the relative position vector (and therefore relative range) is observable from the in-plane angle measurements.

EXAMPLE NUMERICAL RESULTS

Provided below are example numerical results and further description of embodiments of the present invention. Associated figures provide illustrations and results for embodiments of the present invention of guidance and navigation for three scenarios: a far-field rendezvous at approximately 200 km without a laser range finder; laser ranger finder pointing accuracy at medium range (~10 km) without sensor misalignments; and the laser rangefinder pointing accuracy in presence of misalignment of all sensors.

In the first scenario, although the Clohessey-Wiltshire equations are not appropriate at a relative in-track distance of 200 km for satellites at 500 km altitude, the conclusions that will be drawn based on these results hold true even when the relative motion is modeled in an inertial frame or the distance between the two spacecraft is shorter (~10 km).

The objective of the first scenario is to show observability of the range from the angle measurements. This avoids the necessity of a long-range laser range finder (LRF) and the attitude control hardware necessary for the tight pointing to a target. An additional objective of this scenario is to show that if the visible sensor measurements are interrupted due to poor lighting of the target satellite, the range estimation error does not grow in that period provided the accelerometers continue to measure acceleration of the chaser satellite and there is an estimate of any other unmeasured relative acceleration between the two spacecraft.

If a laser range finder (LRF) is used at a range of ~10 km, a second scenario illustrates the performance of a tight attitude control system to point a visible sensor at a target satellite using angle measurements of the sensor, in presence of the sensor noise, SIGI navigation errors, and gyro/star tracker attitude determination errors. In this scenario, all sensors are assumed to be aligned perfectly.

The third scenario considers misalignments between the visible sensor, laser rangefinder, gyros and star tracker. The objective of this illustration is to determine the limits of various misalignments without violating the pointing accuracy requirements.

The three scenarios use a rendezvous sensor suite comprising a visible sensor, an infrared sensor, and a laser rangefinder. Their range of operation and noise characteristics are presented in Table 1. In each scenario, it will be stated which sensor(s) is (are) used.

TABLE 1

Visible, IR, and Lidar Sensor Parameters

| | Visible Sensor | | IR Sensor | | Laser Range Finder | |
|---|---|---|---|---|---|---|
| Acquisition Range | ≦200 km | | ≦20 km | | ≦10 km | |
| LOS Angle Measurement Noise | 0.182 mrad (1σ) 0.182 → 20 mrad (1σ) | 200 ≧ r ≧ 11 km 11 ≧ r ≧ 0.1 km | 1.02 mrad (1σ) 1.02 → 20 mrad (1σ) | 20 ≧ r ≧ 2 km 2 ≧ r ≧ 0.1 km | | |
| Range Measurement Noise | 0.1 r (1σ) | 0.2 ≧ r ≧ 0.001 km | 0.1 r (1σ) | 0.1 ≧ r ≧ 0.001 km | 100 → 20 m (1σ) 5 m (1σ) | 10 ≧ r ≧ 0.2 km 0.2 ≧ r ≧ 0.1 km |

Example Scenario 1

Observability of Range from Angle Measurements and Effects of Measurement Interruptions FIG. 6 illustrates a nominal scenario of a far-field rendezvous starting from ~200 km behind and 8 km below a target satellite and the associated timeline. Specifically, the chaser starts at a relative position of $[-200\ 0\ 8]^T$ km in the LVLH- frame at t=0 with a relative velocity $\dot{x} = 3\omega_{orb} z$ in the LVLH frame so that the chaser drifts at a constant altitude towards the target satellite until it reaches the coordinates $[-28\ 0\ 8]$ km from the target where $\dot{y}=0$, $\dot{z}=0$. With a suitable increment $\Delta \underline{V}$ at this location, the chaser is navigated to −6 km behind the target at zero relative altitude, and then to −1 km to +0.12 km with additional $\Delta \underline{V}$s, each after a transit period sufficiently different from the singular transit periods discussed in Ref. 12. The chaser attitude determination and control system are not simulated in this scenario. For initial conditions in the simulation, the above nominal scenario is perturbed. The true coordinates of the chaser satellite, $\underline{r}$, and its estimate, $\hat{\underline{r}} = [\hat{x} \; \hat{y} \; \hat{z}]^T$, are initialized to $$\underline{r} = \begin{bmatrix} -200 + 5 \\ 0 + 2 \\ 8 + 2 \end{bmatrix} \text{km}, \; \hat{\underline{r}} = \begin{bmatrix} -200 - 2 \\ 0 - 2 \\ 8 - 2 \end{bmatrix} \text{km}. \tag{38}$$

where estimation errors $\hat{\underline{r}} - \underline{r}$ represents the initial relative navigation errors at the time of target acquisition.

Two cases are considered: uninterrupted visible sensor measurements and twice-interrupted measurements. For the uninterrupted case, the true relative velocity $\dot{\underline{r}}$ of the chaser in the LVLH frame and its estimate $\hat{\dot{\underline{r}}}$ are initialized as $$\dot{\underline{r}} = \begin{bmatrix} 3\omega z_{true}/2 \\ 0.2 \\ 0.2 \end{bmatrix} m/s, \; \hat{\dot{\underline{r}}} = \dot{\underline{r}} + \begin{bmatrix} 0.0 \\ 0.2 \\ 0.0 \end{bmatrix} + \Delta \underline{V} * 1.005 \; m/s \tag{39}$$

where 0.5 percent is the $\Delta \underline{V}$ measurement error of the accelerometer.

For the measurement interruption case, the initial values of $\dot{\underline{r}}$ and $\hat{\dot{\underline{r}}}$ are slightly different $$\dot{\underline{r}} = \begin{bmatrix} 3\omega z_{true}/2 \\ 0.2 \\ 0.0 \end{bmatrix} m/s, \hat{\dot{\underline{r}}} = \dot{\underline{r}} + \begin{bmatrix} 0.0 \\ 0.4 \\ 0.2 \end{bmatrix} m/s \tag{40}$$

Apart from the $\Delta \underline{V}$ firings for guidance purposes, there is no other differential acceleration modeled in the simulation. If any differential acceleration exists between two vehicles, it must be modeled and accounted for in the relative motion dynamics.

The above scenario is implemented using guidance and relative navigation algorithms formulated in Ref. 1 based on Clohessey-Wiltshire equations. FIGS. 7a and 7b illustrate the true and the estimated in-plane trajectories of the chaser satellite relative to the target satellite according to the nominal scenario of FIG. 6 with the initial conditions as specified by Eqs. (38–40). The visible sensor provides angle measurement of the target at 4 Hz. With the first few angle measurements, the relative Kalman filter changes the initial z estimate from 6 km to a $\hat{z}$ that is proportional to $\hat{x}(0)$, or $\hat{z} = \hat{x}(z/x) = -202 \times 10/(-195) = 10.36$ km. Because the relative altitude is almost constant (there is a slight variation in z because $\dot{z} = 0.2$ m/s instead of $\dot{z} = 0$), until the downrange x reduces to −28 km, the $\hat{z}$ does not approach the true z (with the relative position estimation errors shown subsequently, in FIGS. 10–11). In FIGS. 7a, 8a, 9a, 10a, and 11a the visible sensor measurements are uninterrupted, while in FIGS. 7b, 8b, 9b, 10b, and 11b the measurements are interrupted twice, each time for an hour, from t=15 to 75 minutes and again from t=95 to 155 minutes. In these figures, the beginning and end of the interruptions are marked by ○ and □ symbols. In FIG. 7b, because of absence of any unmodeled deterministic acceleration, the absence of measurements does not noticeably deteriorate the estimated trajectory of the chaser. FIGS. 8a and 8b show the true in-plane line-of-sight (LOS) angle measurement, elevation, or pitch, of the target and its measured value with measurement noise of the visible sensor as specified in Table 1. (In this example, the visible sensor focal plane measurements and its attitude have been merged together.) The relative navigation Kalman filter of one embodiment of the present invention uses these elevation and azimuth (not shown here, for brevity) discrete measurements at 4 Hz and estimates the relative motion state vector $[x, y, z, \dot{x}, \dot{y}, \dot{z}]^T$. From these estimates, the line-of-sight (LOS) angles are estimated. FIGS. 9a and 9b show the estimation error $\hat{\theta}_y - \theta_y$. By comparing the uninterrupted measurement case, FIG. 9a, with the interrupted measurement case, FIG. 9b it may be seen that the pitch angle estimation error grows to 1–2 mrad when angle measurements are not available. But as soon as angle measurements resume at t=4500 s (75 minutes) and 9300 s (155 minutes), these estimation errors drop to the measurement noise level (0.2 mrad, 1σ, for $x \geq 11$ km). The x- and z-estimation errors versus time are illustrated in FIGS. 10a and 10b and FIGS. 11a and 11b, respectively. These estimation errors are compared with the square root of the corresponding diagonal elements of the error covariance matrix, $\pm \sqrt{P_{xx}}$ and $\pm \sqrt{P_{zz}}$, respectively. The magnitude of the initial x-estimation error is much larger than $\sqrt{P_{xx}}$, and a gradual decrease in the x-error is observed until the target range becomes measurable ($\leq 10$ km) by a laser rangefinder. In FIG. 10b, it is shown that the x-estimation error continues to decrease even in the absence of angle measurements because (a) just prior to the measurement cut-off a good estimate of the state vector $[x, y, z, \dot{x}, \dot{y}, \dot{z}]$ is obtained, (b) there are no unmodeled accelerations in the simulation, and (c) it can be shown that the x-estimation error depends on $\tilde{z}/z$ where $\tilde{z}$ is the z-estimation error. Therefore, as x decreases linearly, so does the x-estimation error. The element $\sqrt{P_{xx}}$ diverges when the measurements are absent, as seen in FIG. 10b, but when the measurements resume it drops to levels achieved with uninterrupted measurements. The $\tilde{z}$ estimation error versus time in FIG. 11a does not diminish with angle measurements because z is almost constant and $\hat{z} \approx z(\hat{x}/x)$. When the short-range laser rangefinder becomes operational around t=10,000 s, $\tilde{z}$ decays quickly to nearly zero. If the measurements are interrupted, the variance $P_{zz}$ grows, but, similar to $P_{xx}$, it drops as soon as the measurements resume to levels of $P_{zz}$ without interruption.

Finally, analogous to the x-estimation error, FIGS. 12a and 12b illustrate the range estimation error versus range with and without measurement interruptions. Consistent with the x-estimation error, the initial range estimation error transitions to values more in line with the angle measurements, measurement noise, and relative translation dynamics. After transients, the range estimate error decreases steadily as range decreases due to the drift at a constant altitude. As before, measurement interruptions in FIG. 12b have virtually no effect on the net range estimation error. The square root of the norm of the covariance matrix of the position vector (x, y, z), $\sqrt{P_{rr}}$, is shown in FIG. 13a for the no interruption case and in FIG. 13b for the interruption case. As with the $\sqrt{P_{xx}}$, the $\sqrt{P_{rr}}$ decreases steadily as range decreases when measurements are not interrupted. The $\sqrt{P_{rr}}$ grows when angle measurements are interrupted, but, similar to $\sqrt{P_{xx}}$, drops to nominal values when measurements resume.

These results show that navigating a chaser satellite from a long range (~200 km) with angle measurements of only a visible sensor has no adverse effect on the relative position estimation errors even if the angle measurements are interrupted twice, each time for an hour.

The preceding results were obtained treating both vehicles as point masses, assuming zero gyro/star tracker noise, and having no unmodeled acceleration. These limitations are removed in the following illustrations.

Example Scenario 2

Laser Range Finder Pointing

In this section, attitude determination errors arising from gyros and star tracker noises as filtered by the analytic steady-state six-state Kalman filter of one embodiment of the present invention are illustrated. Table 2 records the noise parameters of a SIGI gyro and a selected star tracker. The star tracker noise about its focal plane axes, 35 μrad, (1σ), is one-eighth of the noise about its boresight axis (280 μrad, 1σ). The three nondimensional parameters $S_e$, $S_v$ and $S_u$ corresponding to the gyro errors and star tracker noise about the focal plane axes for different star tracker measurement intervals are also presented in Table 2.

TABLE 2

Comparison of SIGI Gyro and CT-633 Star Tracker Noises

Gyro Noise Parameters

| | |
|---|---|
| Bias (drift rate) | 0.02 μrad/s |
| Rate of change of bias ($\sigma_u$) | 4.0 e-12 rad/s$^{3/2}$ |
| Random walk rate ($\sigma_v$) | 0.75 μrad/s$^{1/2}$ |
| Quantization as white noise ($\sigma_e$) (readout noise, electronic noise) | $1.6\,(=5.4/\sqrt{12})\,\mu\text{rad}$ |

Star tracker noise $\sigma_{st}$

| | |
|---|---|
| Focal plane axis (1σ per axis) | 35 μrad |
| boresight axis (1σ) | 280 μrad |

Dimensionless parameters comparing gyro noise with star tracker noise ($\sigma_{st}$ = μrad)

star tracker measurement interval = T
readout noise: $S_3 = \sigma_3/\sigma_{ST} = 0.05$
Drift rate change in T seconds $$s_u = T^{3/2}\sigma_u/\sigma_{st} = \begin{cases} 10^{-7} & \text{for } T = 1\text{ s} \\ 6e^{-4} & \text{for } T = 300\text{ s} \end{cases}$$

Random walk in T seconds $$s_v = T^{1/2}\sigma_v/\sigma_{st}$$
$$= \begin{cases} 0.02 & \text{for } T = 1\text{ s} \\ 0.37 & \text{for } T = 300\text{ s} \\ 1 & \text{for } T = 2177\text{ s}\,(\sim 36\text{ minutes}) \end{cases}$$

The parameter $S_e$=0.05 indicates that the star tracker is twenty times noisier than the gyro. The noise arising from the change in the gyro drift rate in 1 second is $10^{-7}$ compared to the star tracker noise $\sigma_{st}$ and $6\times 10^{-4}$ in 300 seconds. Lastly, random walk of the gyro in 1 second is 0.02 compared to the star tracker noise and 0.37 in 300 seconds. These parameters suggest that if the star tracker measurements are used frequently (~1 s) to correct for gyro errors, the attitude estimation error will be of the order of gyro readout noise (1.6 μrad, 1σ), and random walk error will be largely corrected.

In support of this observation, FIGS. 14a and 14b illustrate roll, pitch, yaw, attitude and drift rate estimation errors before and after star tracker measurement updates. These results are obtained for a star tracker whose boresight axis is in the orbit plane and tilted toward zenith by 15 degrees from the —x-axis. This results in roll, pitch, and yaw star tracker noise equal to 280, 35, and 106 μrad, respectively. This star tracker orientation applies to all remaining example embodiments described below. It may be seen in FIGS. 14a and 14b that the attitude estimation errors of gyros grow significantly due to random walk as the star tracker measurement interval increases, and the drop in the estimation error with the star tracker measurement update is insignificant even when the measurement interval is 100 s because the gyro drift rate change is extremely low. While FIGS. 14a and 14b suggest that the star tracker measurement interval should be as short as 1 s or even shorter, Ref. 3 indicates that, for low-Earth orbits, this interval should be greater than or equal to 6 s so that the low- and high-frequency spatial noises in the star tracker measurements, not modeled here, disappear. More detailed illustration of the influence of star tracker measurement interval on laser rangefinder pointing accuracy is presented below.

It is demonstrated above in Example Scenario 1 that when a chaser satellite is drifting towards a target satellite, the visible sensor along with a Kalman filter for relative navigation of one embodiment of the present invention yields a satisfactory estimate of range between the two spacecraft, and therefore it is not necessary to measure the distance with a laser rangefinder (LRF). From a distance of 10 km (the maximum range of an LRF), pointing a laser rangefinder at a target requires a tight attitude control that may be expensive to implement. Nonetheless, should a laser rangefinder be used, it is now illustrated that the LRF pointing architecture of one embodiment of the present invention shown in FIG. 1 can point the LRF to a target within the accuracy requirement. The scenario considered is shown in FIGS. 15a and 15b wherein the chaser satellite is 8.8 km behind and 4.8 km below the target, about 10 km away. The initial relative velocity of the chaser satellite is such that it approaches the target satellite at the origin of the LVLH frame along the trajectory in the orbit plane as shown in FIGS. 15a and 15b. The visible sensor measures the azimuth and elevation of the target image in the focal plane, the gyros and star tracker measure attitude of the sensor focal plane, the six-state analytic steady-state filter of one embodiment of the present invention estimates the chaser attitude based on the gyro and star tracker measurements, this attitude estimate and the visible sensor measurements are used as shown earlier in an embodiment of the present invention, and the relative navigation Kalman filter of one embodiment of the present invention estimates the relative position and velocity of the target. The estimated and the true relative position vectors are shown in FIG. 16a and the corresponding estimation errors in x, y, z and the range r are shown in FIG. 16b.

As expected, the position estimation errors decrease with time, seen clearly for the range error from 600 to 375 meters. Using these estimates and the velocity estimates, the pointing and rate commands of one embodiment of the present invention are calculated as formulated earlier and inputted to the attitude controller. These commands are tracked as illustrated in FIG. 17 for roll, pitch, and yaw rate commands. As a result, after initial transients, the target image remains within the visible sensor focal plane and the azimuth and elevation of the image motion relative to the focal plane center is shown in FIG. 18 when the visible sensor, LRF, gyros and star tracker each are oriented perfectly or near perfectly. FIG. 18 shows that the visible sensor and, therefore, the collimated LRF are pointed at the target well within the pointing accuracy requirement of 88 μrad. In this exemplary embodiment of the present invention, three gyro/star tracker update intervals are considered: 1, 15, and 300 s. Though, contrary to expectations, as the gyro update interval increases, the pointing accuracy improves; this conclusion changes when sensor misalignments are considered.

Example Scenario 3

Laser Rangefinder Pointing Accuracy with Sensor Misalignments

Since the LRF pointing is achieved by feeding back the visible sensor angle measurements, it is reasonable to expect reduced sensitivity of pointing accuracy to a misalignment between visible sensor, gyros and star tracker.

Figure 19A:
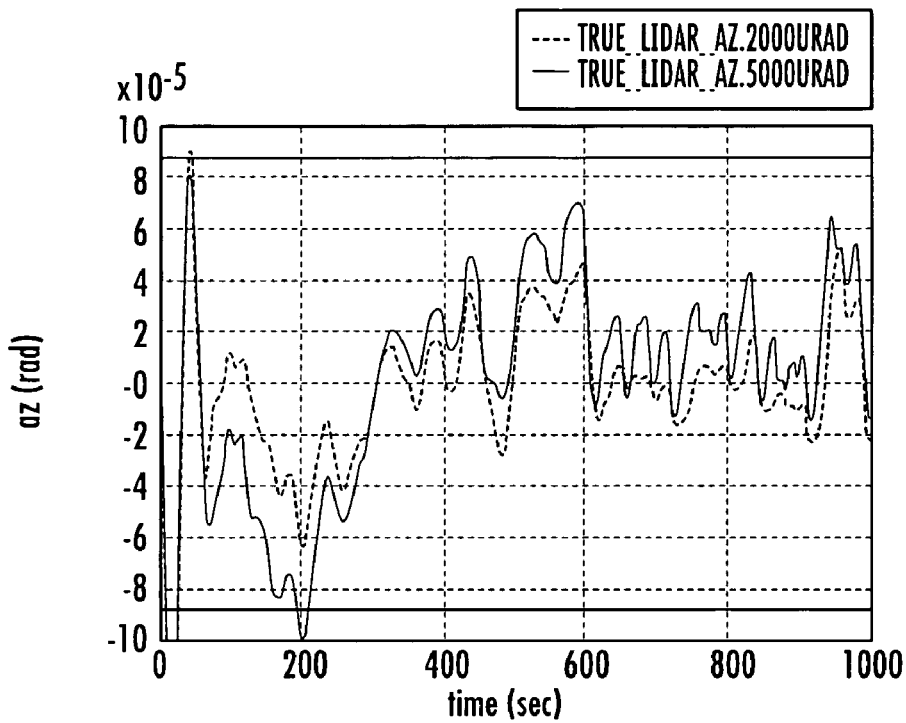
Figure 19B:
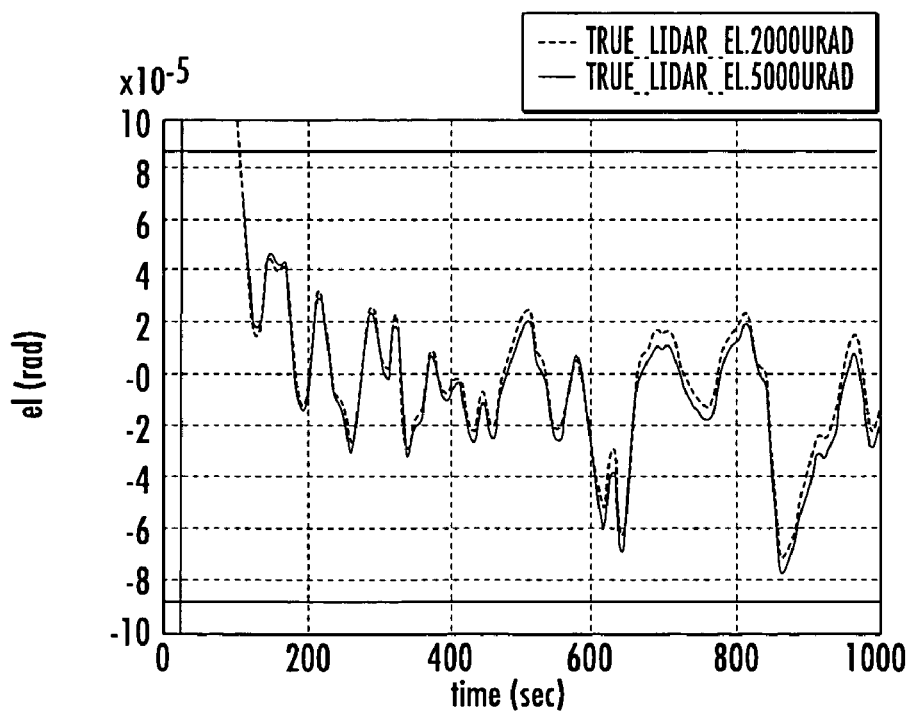

FIGS. 19a and 19b illustrate relative navigation and attitude controls working together to effect laser rangefinder pointing in the presence of both gyros and a star tracker independently misaligned with respect to the visible sensor frame, while the visible sensor and the laser rangefinder are collimated perfectly or near perfectly. The gyro frame is assumed to be orthogonal but misaligned by 2 millirad about each axis in one example and 5 millirad in the other example. Denoting a misalignment angle vector as $\delta\underline{\theta}_{ma}$, the transformation matrix from the perfectly aligned frame to the imperfectly aligned but orthogonal frame is given by $[1-\delta\underline{\theta}_{ma}^{x}]$. In the two examples, the star tracker, in comparison to the gyros, is misaligned by −2 and −5 mrad about each axis, respectively. In this misalignment scenario, in contrast with the example of perfect alignment in FIG. 13, the star tracker update interval is found to influence the laser rangefinder pointing accuracy significantly, and an interval of 1 s is determined to be essential to meet the pointing accuracy with margin, as illustrated in FIGS. 19a and 19b. FIG. 19a compares the target image motion in azimuth for ±2 and ±5 mrad misalignments; FIG. 19b compares the target image motion in elevation for ±2 and ±5 mrad misalignments. The laser rangefinder pointing accuracy is, after initial transients, within the pointing requirement of ±88 μrad.

FIG. 20 illustrates the LRF pointing accuracy for gyro and star tracker misalignment angles reduced to 1 and −1 mrad/axis, respectively, but with additional 0.5 mrad/axis misalignment of the visible sensor and 0.55 mrad/axis misalignment of the LRF with respect to their respective ideal orientations. In other words, the LRF and the visible sensor boresights are misaligned by 50 μrad about azimuth and elevation axes. The 50 μrad bias error is seen in target image motion in the visible sensor focal plane in FIG. 20 that compares the star tracker measurement update intervals of 1 and 15 s. In FIG. 20, apart from seldom exceedancee in azimuth of ±88 μrad pointing requirement, the LRF pointing accuracy is within requirements even in presence of the above selected misalignment angles of the four sensors.

Table 3 summarizes the allowable misalignments of the four sensors. These misalignments are unknown to the laser rangefinder pointing technology embodiment of the present invention presented herein. If the misalignment between an LRF and a visible sensor can be controlled to a greater precision during installation, 20 μrad instead of 50 μrad for instance, then larger (than 1 mrad) misalignments of gyros and star tracker will be permissible.

TABLE 3

Limiting Misalignment Angles of Various Sensors

| Gyro | <1 mrad |
| --- | --- |
| Star tracker | <1 mrad |
| Visible sensor | <0.5 mrad |
| Visible/LRF | <0.05 mrad |

A high-fidelity model of reaction wheel speed/torque characteristic is implemented in the simulation of exemplary Scenarios 2 and 3 above. See Ref. 13.

The preceding observability analysis and simulation results indicate that angle measurements of a visible camera may be used effectively for gross estimation of range of a chaser satellite from a target satellite. The range estimation error does not become zero rapidly with angle measurements, but decreases gradually as the chaser satellite approaches the target satellite. In the event of visible sensor measurement interruptions, range estimation errors do not grow; instead, they continue to decrease, provided that before interruption, a relative navigation filter has minimized its steady-state relative position and velocity estimation errors and there are no relative accelerations unmodeled or unknown to the filter. In view of these observability results, a rendezvous sensor suite of one embodiment of the present invention may not include a ~10 km laser rangefinder and an associated tight-pointing controller.

If a laser rangefinder is nonetheless used to determine the relative range between the two satellites, a tight pointing control system for the laser rangefinder of one embodiment of the present invention is provided that includes visible sensor focal plane angle measurements, an extended Kalman filter for relative navigation, pointing and rate commands, a six-state attitude determination Kalman filter using gyros and a star tracker, and an attitude controller. The laser rangefinder pointing architecture of one embodiment of the present invention achieves the estimated long-range pointing accuracy requirements. This architecture of one embodiment of the present invention is useful in other flight phases as well; for instance, it is effective in a 24-pulse closed-loop circumnavigation of the target satellite at a radius of 100 meter.

FIG. 21 is a flowchart of a method for a system of a closed-loop autonomous guidance, navigation, and control architecture of one embodiment of the present invention. The flowchart presents subsystems and data calculations for the inertial navigation component, relative navigation component, and pointing and rate commands component with the associated devices required or used with these different subsystems. External objects, such as GPS satellites, constellation 102 and the target satellite 128 are provided for reference to show where data can be captured from these external objects by the system 100. For example, in the inertial navigation component, the SIGI, or space integrated GPS and INS system, 110 acquires information and data measurements from the GPS satellites constellation 102 using a GPS receiver 118. Similarly, a laser range finder 132, visible sensor 134, or infrared sensor 136 of the rendezvous suite 130 obtains measurement data from the target satellite 128. The inertial navigation component of the embodiment includes the SIGI system 110, a star tracker 124, and an inertial attitude Kalman filter 126. The relative navigation component includes a rendezvous suite 130 and a relative navigation Kalman filter 140. The pointing and rates commands 142 include quaternion pointing commands 144 and rate commands 146.

The flowchart presented in FIG. 21 presents a summary depiction of data and measurements that flow between the systems and devices of an embodiment of the present invention. By way of example of the flow of data or measurement data and calculations through the system 110, a GPS receiver 118 provides position and velocity of the chaser satellite at time t, gyros 114 provide spacecraft attitude and rate, and accelerometers 116 provide incremental velocities for a SIGI inertial navigation Kalman filter 120. The inertial attitude Kalman filter 126 is presented with gyro 114 output and star tracker 124 measurements. The inertial attitude Kalman filter 126 feeds back attitude correction to the SIGI inertial navigation Kalman filter 120. A visible sensor 134 and an infrared sensor 136 provide azimuth and elevation angle measurements and, possibly, passive range measurements 138. These measurements and the measurements 138 from a laser range finder 132, accelerometers 116, and the SIGI inertial navigation Kalman filter 120 provide input to a relative navigation Kalman filter 140. The relative navigation Kalman filter 140 produces relative position and velocity estimates that are used to generate pointing and rate commands 142 and guidance of the satellite 152. The pointing and rate commands 142 are used for attitude control using reaction wheels 154. The guidance 152 provides incremental velocity commands for translation control of the spacecraft. Together with FIGS. 1, 2A, and 2B, one skilled in the art will recognize application of embodiments of the present invention for relative navigation, attitude determination, pointing, and tracking for spacecraft rendezvous.

The inertial navigation, relative navigation, and pointing and rate commands components of the present invention are described herein by their separate component elements; however, they are meant to include both the separately described component elements and associated computer programs or computer program products required for performing the described functionality of the component elements.

An embodiment of the present invention may be effected by a computer system. In this regard, such a computer system may include at least one control processor, such as a processor or central processing unit (CPU), interoperably connected to, and implementing software and data stored by, memory such as random access memory (RAM) or other storage devices. The control processor may interface with other system components to accept inputs and generate outputs, including translation and rotation commands for a chaser satellite to rendezvous with a target satellite. For example, a control processor may interface with system components of inertial navigation, relative navigation, and pointing and rate commands components, a guidance controller, an attitude controller, a reaction jet controller, and a reaction wheel controller. One skilled in the art will recognize that embodiments of the present invention may be one computer system or a group of distributed computer systems. One or more processors, memory, storage devices, and other computer elements may be used in common by a computer system and subsystems, as part of the same platform, or processors may be distributed between a computer system and subsystems, as parts of multiple platforms.

It will be understood that each block, step, or element of the flowcharts described herein, and combinations of blocks and/or elements in the flowchart described herein, support combinations of means and combinations of steps for performing the specified functions. Similarly, it will be understood that each block, step, or element of the flowchart, and combinations of blocks and/or elements in the flowchart, can be implemented by computer program instructions. These computer program instructions may be loaded onto the computer system described above or other programmable apparatus to produce a machine, such that the instructions which execute on the computer or other programmable apparatus create means for implementing the functions specified in the flowchart block(s) or element(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or element(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or element(s). It will also be understood that each block or element of the flowchart, and combinations of blocks and/or elements in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art, to which these inventions pertain, having the benefit of the teachings presented in the foregoing descriptions and the associated drawings. Therefore, it is to be understood that the inventions are not to be limited to the specific embodiments disclosed, and that modifications and other embodiments are intended to be included within the scope of the appended claims. Although specific terms are employed herein, they are used in a generic and descriptive sense only and not for purposes of limitation.

That which is claimed:

1. A closed-loop autonomous relative navigation system, comprising:
   an inertial navigation component;
   a relative navigation component interoperably connected to said inertial navigation component;
   a pointing and rate commands component interoperably connected to said relative navigation component;
   a guidance controller interoperably connected to said inertial navigation and said relative navigation components for providing guidance commands;
   an attitude controller interoperably connected to said pointing and rate commands component for accepting attitude commands; and
   a translation controller interoperably connected to said guidance controller and said pointing and rate commands component for accepting guidance and translation commands.

2. The autonomous relative navigation system of claim 1, further comprising a rotational controller interoperably connected to said guidance controller and said pointing and rate commands component for accepting guidance and rotational rate commands.

3. The autonomous relative navigation system of claim 1, wherein said inertial navigation component comprises a space integrated global positioning system (GPS) and an inertial navigation system (INS).

4. The autonomous relative navigation system of claim 1, further comprising a visible sensor wherein said pointing and rate commands component is interoperably connected to said visible sensor and provides commands to orient the pointing of said visible sensor.

5. The autonomous relative navigation system of claim 1, wherein said relative navigation component comprises a rendezvous sensor suite and wherein said rendezvous sensor suite includes a laser range finder collimated with said visible sensor.

6. The autonomous relative navigation system of claim 5, wherein said pointing and rate commands component continues to operate even when said rendezvous sensor suite is misaligned or interrupted.

7. A control system for providing guidance of a body in space, comprising:
  a control processor for sending command signals;
  an inertial navigation component interoperably connected to said control processor for determining inertial position, velocity, attitude, and rate of said body in space;
  a relative navigation component interoperably connected to said control processor for determining relative position, velocity, and rotation of said body in space in relation to a target in space wherein said relative navigation component comprises a rendezvous sensor suite for providing measurements to said relative navigation component;
  a pointing and rate commands component interoperably connected to said control processor for computing pointing and rate commands for said body to track said target;
  an attitude controller interoperably connected to said control processor for accepting attitude and rate commands from said control processor and providing control torque commands for said body; and
  a translation controller interoperably connected to said control processor for accepting incremental velocity commands from said control processor and providing incremental velocity to said body according to said incremental velocity commands.

8. A method for an autonomous closed-loop relative navigation system of a chaser satellite, comprising:
  receiving inertial navigation variables of the chaser satellite;
  measuring relative line-of-sight angles relative to a target satellite using a rendezvous sensor suite;
  estimating relative position and velocity of the target satellite using a relative navigation Kalman filter, said relative measurements, and said inertial navigation variables;
  calculating pointing and rate commands for tracking the target satellite using said relative position and velocity estimates; and
  controlling translation and rotation of the chaser satellite using said relative position and velocity estimates and pointing and rate commands.

9. The method of claim 8, further comprising the step of measuring relative range of the chaser satellite relative to the target satellite using the rendezvous sensor suite.

10. The method of claim 8, wherein said inertial navigation variables are the output of a navigation Kalman filter.

11. The method of claim 10, further comprising the steps of:
  determining a desirable star tracker measurement interval from a Kalman filter to determine inertial attitude and rate of the chaser satellite; and
  determining inertial attitude and rate of the chaser satellite.

12. The method of claim 11, wherein said step of determining inertial attitude and rate comprises blending gyro attitude measurements with time-matched star tracker measurements.

13. The method of claim 12, wherein said step of determining inertial attitude and rate further comprises calculating difference $\underline{v}_{st/gyro}$ in the spacecraft inertial attitude as measured by gyros and star tracker concurrently.

14. The method of claim 8, further comprising the step of determining inertial attitude and rate of the chaser satellite, wherein said step of determining inertial navigation variables comprises estimating inertial attitude using an attitude determination Kalman filter.

15. The method of claim 14, wherein said inertial attitude is a three-axis inertial attitude, and wherein said three-axis inertial attitude immediately after star tracker update is $\hat{\underline{C}}_{0,gyro,I}(+)$ with a $(1-\zeta^{-2})\underline{v}_{st/gyro}$ update factor for each of the three orthogonal axes.

16. The method of claim 15, wherein said chaser satellite comprises three orthogonal gyros and at least one star tracker, and wherein said step of determining inertial attitude corrects measurement errors of said three gyros with measurements of said at least one star tracker.

17. The method of claim 15, wherein said step of determining inertial attitude is performed in three orthogonal axes by a steady-state Kalman filter attitude determination.

18. The method of claim 17, wherein said step of correcting measurement errors of said gyro measurements further uses an attitude Kalman filter with at least six states for three axes.

19. The method of claim 17, wherein said updating is a periodic correction.

20. The method of claim 8, wherein said step of estimating relative position and velocity is performed using measurements of at least one visible sensor and an extended Kalman filter that may be based on linear Clohessy-Wiltshire equations.

21. The method of claim 20, wherein said step of estimating relative position and velocity is performed for a relative range less than ten kilometers (10 km) between the chaser satellite and target satellite.

22. The method of claim 20, wherein said at least one visible sensor provides azimuth and elevation angle focal plane measurements.

23. The method of claim 20, wherein an infrared sensor measures relative line-of-sight azimuth and elevation angles of the target satellite from the chaser satellite.

24. The method of claim 20, wherein a laser range finder measures relative range of the target satellite from the chaser satellite.

25. The method of claim 8, wherein said relative position and velocity are estimated using at least one visible sensor and an extended Kalman filter with at least inertial relative position and velocity as six states for three axes.

26. The method of claim 25, wherein said at least one visible sensor provides azimuth and elevation angle focal plane measurements.

27. The method of claim 26, wherein a rendezvous sensor suite comprises a visible sensor and a laser range finder to provide measurements of azimuth and elevation for said relative position and velocity.

28. The method of claim 27, wherein said rendezvous sensor suite further provides range for said relative position and velocity.

29. The method of claim 8, wherein said relative position and velocity accounts for the offset of the visible sensor focal plane from the chaser satellite center of mass and a misalignment between said visible sensor and the body axes of the chaser satellite.

30. The method of claim 8, wherein said pointing command is $q_{cr}$.

31. The method of claim 8, wherein said pointing command is solved by the equation $$q_{cl} = \frac{1}{\sqrt{2(1+\underline{b}\cdot\underline{u})}}\left[(\underline{b}\times\underline{u})\cos\frac{\phi}{2} + (\underline{b}+\underline{u})\sin\frac{\phi}{2}, (1+\underline{b}\cdot\underline{u})\cos\frac{\phi}{2}\right].$$

32. The method of claim 8, wherein said rate command is $\omega_{cr}$.

33. The method of claim 8, wherein said pointing commands orient the boresight of a visible sensor at said target satellite.

34. The method of claim 33, wherein said pointing commands further orient a solar array of the chaser satellite normal to the Sun.

35. The method of claim 8, wherein said pointing commands orient a laser range finder at said target satellite.

36. The method of claim 35, wherein said pointing commands further orient a solar array of the chaser satellite normal to the Sun.

37. The method of claim 8, wherein said pointing commands have a degree of freedom.

38. The method of claim 37, wherein said degree of freedom is a roll angle $\phi$.

39. The method of claim 38, wherein said roll angle $\phi$ is determined from $$q_{cl} = \frac{1}{\sqrt{2(1+\underline{b}\cdot\underline{u})}}\left[(\underline{b}\times\underline{u})\cos\frac{\phi}{2} + (\underline{b}+\underline{u})\sin\frac{\phi}{2}, (1+\underline{b}\cdot\underline{u})\cos\frac{\phi}{2}\right]$$

and the condition of aligning a solar array of the chaser satellite normal to a chaser satellite-sun vector.

40. A method for autonomous guidance of a body in space using a closed-loop system, comprising:
receiving inertial navigation variables of the body;
estimating relative navigation of the body relative to a target body using said inertial navigation variables, wherein said relative navigation estimates include relative position and velocity variables;
calculating pointing and rate commands for tracking the target body using said relative navigation estimates;
controlling translation and rotation of the body from said navigation and attitude commands; and
providing observability of the target body without using a laser range finder.

41. A computer program product comprising a computer usable medium having control logic stored therein for causing a computer to provide guidance of a chaser satellite to rendezvous with a target satellite, said control logic comprising:
a first code for performing inertial navigation of the chaser satellite;
a second code for performing relative navigation of the chaser satellite relative to the target satellite;
a third code for calculating pointing and rate commands to track the target satellite using said relative navigation;
a fourth code for an attitude controller to effect said pointing and rate commands on the chaser satellite;
a fifth code for calculating guidance commands using said inertial and relative navigation; and
a sixth code for a reaction jet controller to effect said guidance commands on the chaser satellite.

42. The computer program product of claim 41, further comprising a seventh code for calculating pointing commands to orient solar arrays of the chaser satellite normal to the Sun.

43. The computer program product of claim 41, wherein said first code uses measurements from gyros, accelerometers, and a star tracker.

44. The computer program product of claim 41, wherein said second code uses measurements from accelerometers, a visible sensor, and an infrared sensor.

45. The computer program product of claim 41, wherein said third code uses estimates of relative position and velocity to calculate the pointing and rate commands.

46. The computer program product of claim 41, wherein said first code includes an inertial attitude Kalman filter.

47. The computer program product of claim 41, wherein said first code updates gyro measurement errors with star tracker measurements using a Kalman filter for attitude determination.

48. The computer program product of claim 41, wherein said second code comprises a relative navigation Kalman filter.

49. The computer program product of claim 41, wherein said second code performs relative navigation of the chaser satellite relative to the target satellite using a Kalman filter.

* * * * *